(12) United States Patent
Haraguchi et al.

(10) Patent No.: US 10,138,972 B2
(45) Date of Patent: Nov. 27, 2018

(54) AIR SPRING AND CARRIAGE FOR VEHICLE

(71) Applicants: SUMITOMO ELECTRIC INDUSTRIES, LTD., Osaka-shi, Osaka (JP); KAWASAKI JUKOGYO KABUSHIKI KAISHA, Kobe-shi, Hyogo (JP)

(72) Inventors: Hirokazu Haraguchi, Osaka (JP); Jun Yoshida, Osaka (JP); Kazuo Isomura, Kobe (JP); Takanori Tojo, Kobe (JP); Masahiro Sakahira, Kobe (JP); Jun Shirasaki, Kobe (JP); Tomohide Maeba, Kobe (JP); Naoki Hikosaka, Kobe (JP)

(73) Assignees: SUMITOMO ELECTRIC INDUSTRIES, LTD., Osaka-shi, Osaka (JP); KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 3 days.

(21) Appl. No.: 15/027,308

(22) PCT Filed: Oct. 6, 2014

(86) PCT No.: PCT/JP2014/076724
§ 371 (c)(1),
(2) Date: Apr. 5, 2016

(87) PCT Pub. No.: WO2015/053231
PCT Pub. Date: Apr. 16, 2015

(65) Prior Publication Data
US 2016/0252153 A1   Sep. 1, 2016

Related U.S. Application Data

(60) Provisional application No. 61/887,528, filed on Oct. 7, 2013.

(51) Int. Cl.
*B61F 5/04* (2006.01)
*F16F 9/05* (2006.01)
(Continued)

(52) U.S. Cl.
CPC .............. *F16F 9/057* (2013.01); *B61F 5/10* (2013.01); *F16F 1/40* (2013.01); *F16F 9/05* (2013.01); *F16F 9/052* (2013.01)

(58) Field of Classification Search
CPC .......... F16F 9/0454; F16F 9/052; F16F 9/057; B60G 11/27; B61F 5/10
See application file for complete search history.

(56) References Cited

U.S. PATENT DOCUMENTS 3,112,922 A * 12/1963 Musschoot ............... F16F 9/04
188/268
6,257,561 B1 * 7/2001 Nakayama ................ F16F 9/05
267/122
(Continued)

FOREIGN PATENT DOCUMENTS

JP    S53-1766 A    1/1978
JP    S63-49036 U   4/1988
(Continued)

*Primary Examiner* — Bradley T King
(74) *Attorney, Agent, or Firm* — Drinker Biddle & Reath LLP

(57) ABSTRACT

Each of an assembly for air spring, an air spring, and a carriage for vehicle includes: a first supporting member; a second supporting member arranged to be spaced away from the first supporting member in a main load direction; and an adjusting member connected to the first supporting member and the second supporting member in a plane crossing the main load direction, the adjusting member having anisotropy in elastic property in the plane crossing the main load direction.

15 Claims, 16 Drawing Sheets

(51) Int. Cl.
*F16F 1/40* (2006.01)
*B61F 5/10* (2006.01)

(56) References Cited

U.S. PATENT DOCUMENTS

| | | | |
|---|---|---|---|
| 9,631,693 B2* | 4/2017 | Street | F16F 9/0454 |
| 2006/0170140 A1* | 8/2006 | Menk | F16F 1/40 |
| | | | 267/35 |
| 2006/0180048 A1* | 8/2006 | Teichman | B60G 11/27 |
| | | | 105/198.1 |
| 2011/0031662 A1 | 2/2011 | Toyama | |
| 2011/0233832 A1* | 9/2011 | Sawa | B61F 5/10 |
| | | | 267/3 |
| 2015/0165853 A1* | 6/2015 | Smith | B60G 11/62 |
| | | | 105/453 |
| 2015/0175176 A1* | 6/2015 | Sato | B61F 5/10 |
| | | | 105/198.1 |

FOREIGN PATENT DOCUMENTS

| | | |
|---|---|---|
| JP | H08-21475 A | 1/1996 |
| JP | H09-11898 A | 1/1997 |
| JP | 3252744 B2 | 2/2002 |
| JP | 2002-206582 A | 7/2002 |
| JP | 2009-197986 A | 9/2009 |
| JP | 2009-204049 A | 9/2009 |
| JP | 2010-151181 A | 7/2010 |
| WO | WO-2012/056863 A1 | 5/2012 |

* cited by examiner

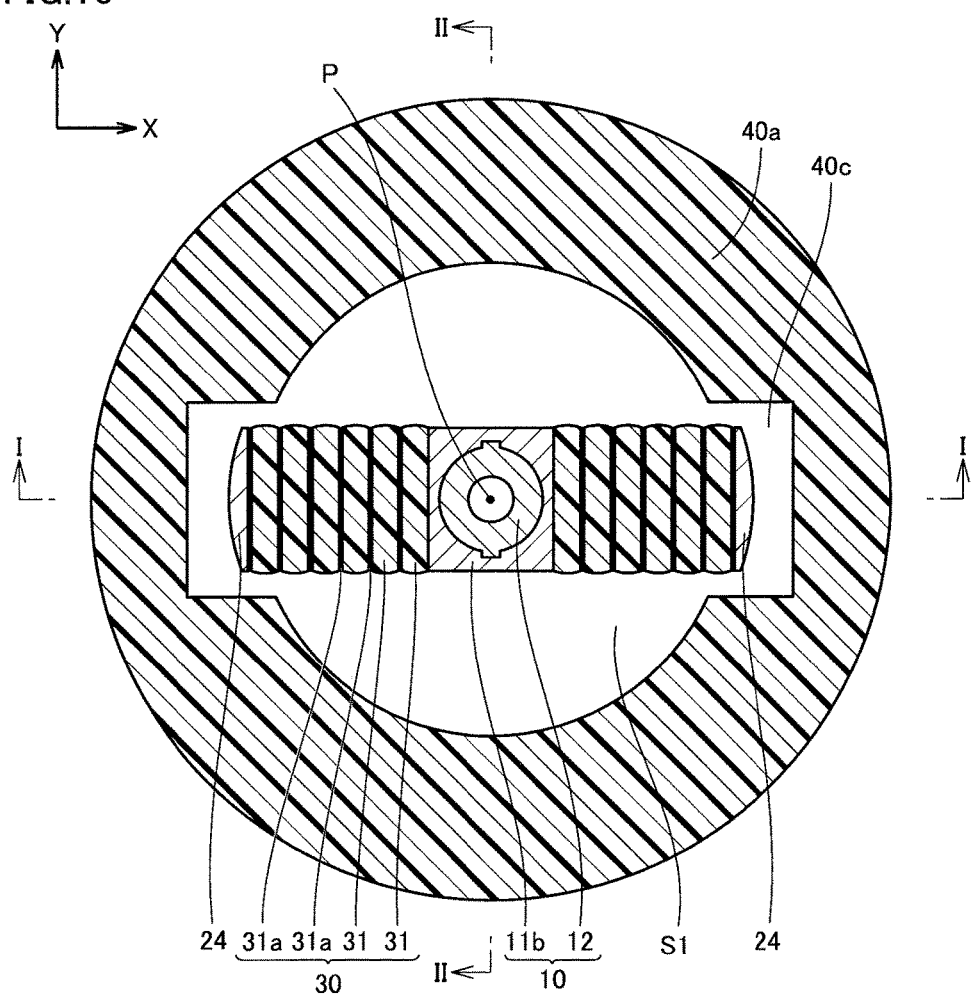

AIR SPRING AND CARRIAGE FOR VEHICLE

RELATED APPLICATION

The present application claims a benefit of the priority of U.S. Provisional Application No. 61/887,528 filed on Oct. 7, 2013, the entire content of which is incorporated herein by reference.

TECHNICAL FIELD

The present invention relates to an assembly for air spring, an air spring, and a carriage for vehicle, more particularly, an assembly for air spring, an air spring, and a carriage for vehicle, each of which can have anisotropy in spring property in a plane crossing a main load direction.

BACKGROUND ART

Conventionally, an air spring used for a vehicle such as a railroad vehicle has been known (see Patent Document 1, for example). Such an air spring is provided between a vehicle body and a carriage of the vehicle to reduce impacts and vibrations applied to the vehicle body during traveling of the vehicle. Accordingly, the load of the vehicle body is exerted onto the air spring mainly in the vertical direction. The direction in which the load of the vehicle body is mainly exerted onto the air spring is defined as a main load direction in the present specification. The main load direction is substantially in parallel with the vertical direction.

The air spring includes an assembly for air spring and a diaphragm. The assembly for air spring is assembled on the carriage side of the diaphragm, for example. The air spring can reduce impacts and vibrations in the main load direction during traveling of the vehicle.

CITATION LIST

Patent Document

PTD 1: Japanese Patent Laying-Open No. 2002-206582

SUMMARY OF INVENTION

Technical Problem

Here, a traveling direction during straight travelling of the vehicle is referred to as "longitudinal direction", and a direction perpendicular to the longitudinal direction and the main load direction (vertical direction) is referred to as "lateral direction". There may be a difference between a spring property of the air spring required in the lateral direction to suppress shaking, inclination, or the like of the vehicle body in the lateral direction and a spring property of the air spring required in the longitudinal direction to suppress shaking, inclination, or the like of the vehicle body in the longitudinal direction. However, it is difficult to provide a conventional air spring with different spring properties in the lateral direction and the longitudinal direction, i.e., to provide anisotropy in spring property of the air spring in a plane crossing the main load direction of the vehicle.

The present invention has been made to solve the above-mentioned problem, and has an object to provide an assembly for air spring, an air spring, or a carriage for vehicle, each of which can have anisotropy in spring property in a plane crossing a main load direction.

Solution to Problem

An assembly for air spring according to one embodiment of the present invention includes: a first supporting member; a second supporting member arranged to be spaced away from the first supporting member in a main load direction; and an adjusting member connected to the first supporting member and the second supporting member in a plane crossing the main load direction, the adjusting member having anisotropy in elastic property in the plane.

An air spring according to one embodiment of the present invention includes: the assembly for air spring; a third supporting member; and an elastically deformable diaphragm that forms a closed space by connecting the second supporting member and the third supporting member to each other.

A carriage for vehicle according to one embodiment of the present invention includes the assembly for air spring, or the air spring.

Advantageous Effects of Invention

According to the description above, there can be provided an assembly for air spring, an air spring, or a carriage for vehicle, each of which can have anisotropy in spring property in a plane crossing a main load direction.

BRIEF DESCRIPTION OF DRAWINGS

FIG. 16 is a schematic cross sectional view of an air spring according to a seventh embodiment of the present invention in an xy plane including an adjusting member and an outer annular stopper.

DESCRIPTION OF EMBODIMENTS

Figure 1:
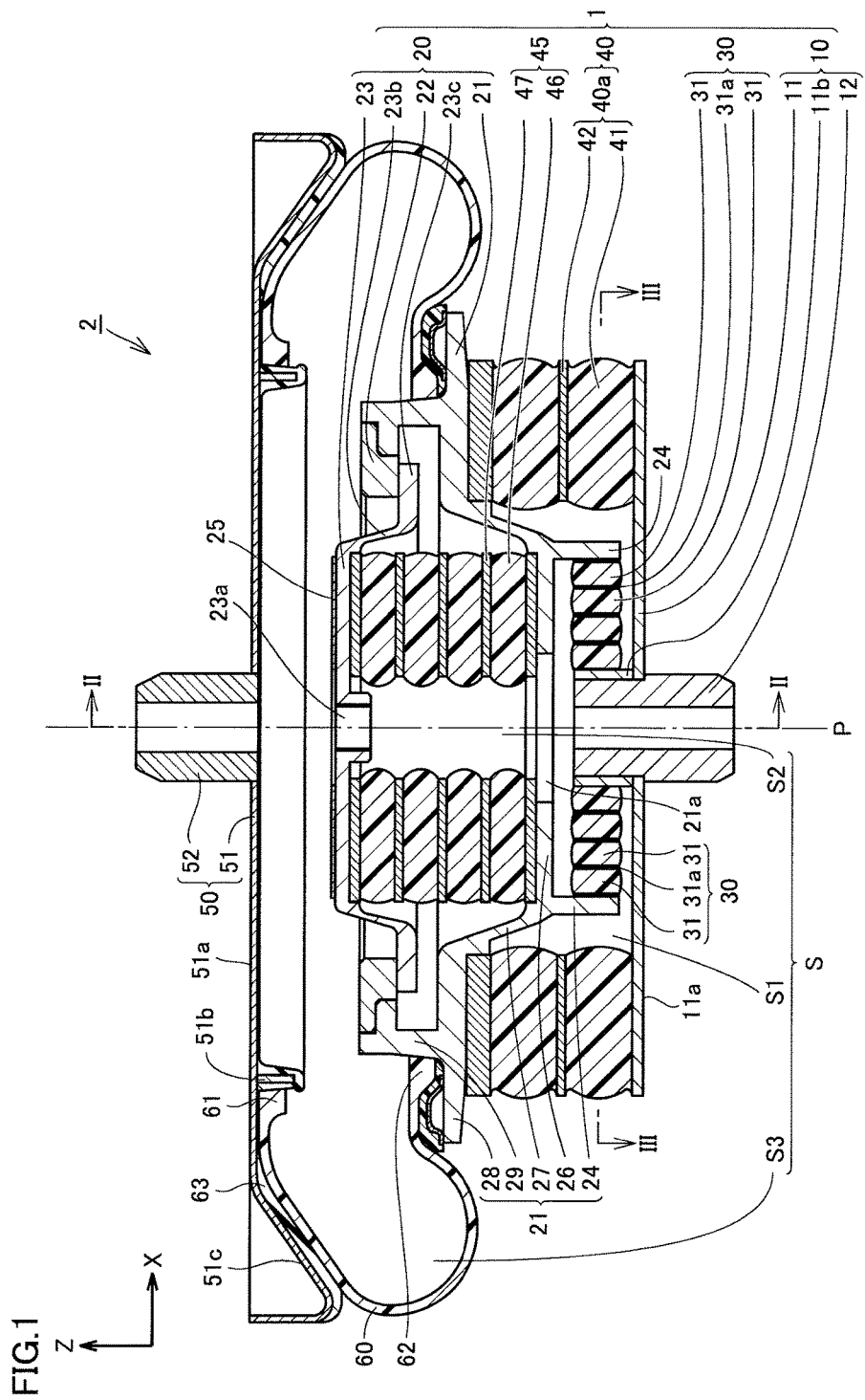
FIG. 1 is a schematic cross sectional view of an air spring according to a first embodiment of the present invention in a lateral direction, and is a schematic cross sectional view along a cross sectional line I-I shown in FIG. 2 and FIG. 3.

The following describes an air spring according to embodiments of the present invention based on figures. It should be noted that in the below-mentioned figures, the same or corresponding portions are given the same reference characters and the description thereof are not described repeatedly.

Description of Embodiments of the Present Invention

First, embodiments of the present invention are listed and described.

(1) An assembly (1, 1a, 1b, 1c, 1d, 1e) for air spring according to one embodiment of the present invention includes: a first supporting member (10); a second supporting member (20) arranged to be spaced away from the first supporting member (10) in a main load direction; and an adjusting member (30) connected to the first supporting member (10) and the second supporting member (20) in a plane crossing the main load direction, the adjusting member (30) having anisotropy in elastic property in the plane. Here, the expression "having anisotropy in elastic property in the plane crossing the main load direction" is intended to indicate that an elastic property (spring property) in a first direction in the plane crossing the main load direction is different from an elastic property (spring property) in a second direction, which is different from the first direction, in the plane crossing the main load direction.

In this way, by providing the adjusting member (30), the assembly (1, 1a, 1b, 1c, 1d, 1e) for air spring can have different spring properties to stresses in the plane crossing the main load direction, depending on a relation between the elastic property (spring property) of the adjusting member (30) and directions of the stresses. Accordingly, there can be provided the assembly (1, 1a, 1b, 1c, 1d, 1e) for air spring, which has anisotropy in spring property in the plane crossing the main load direction.

(2) The assembly (1, 1a, 1b, 1c, 1d, 1e) for air spring according to the one embodiment of the present invention may further comprise an outer cylinder (40, 40b) between the first supporting member (10) and the second supporting member (20), wherein the adjusting member (30) may be arranged inside the outer cylinder (40, 40b).

Since the adjusting member (30) can be incorporated into the inner space of the outer cylinder (40, 40b), the adjusting member (30) can be incorporated into the assembly (1, 1a, 1b, 1c, 1d, 1e) for air spring without increasing the size of the assembly (1, 1a, 1b, 1c, 1e) for air spring.

(3) In the assembly (1, 1a, 1c, 1d, 1e) for air spring according to the one embodiment of the present invention, the outer cylinder (40) may include an outer annular stopper (40a) having an elastic member.

During deflation, in which a diaphragm (60) loses air pressure and is collapsed, the vehicle body of the vehicle is supported by the outer annular stopper (40a). Thus, loss of a cushion property of the diaphragm (60) caused by the deflation is compensated with an elastic property (spring property) of the outer annular stopper (40a). Accordingly, even during the deflation, it is possible to secure traveling safety of the vehicle and riding comfort involving little displeasure.

(4) In the assembly (1c) for air spring according to the one embodiment of the present invention, at least one of the first supporting member (10) and the second supporting member (20) may include an inclination portion (11c, 21c) that provides resistance against deformation of the outer annular stopper (40a) in a direction in which the adjusting member (30) is connected to the first supporting member (10) and the second supporting member (20).

The inclination portion (11c, 21c) provides the outer circumferential stopper (40a) with an anisotropic elastic property (spring property) in the plane crossing the main load direction. In the plane crossing the main load direction, the assembly (1c) for air spring in the one embodiment of the present invention has not only anisotropy in elastic property (spring property) of the adjusting member (30) but also anisotropy in elastic property (spring property) of the outer annular stopper (40a). Accordingly, the assembly (1c) for air spring in the present embodiment can have large anisotropy in spring property in the plane crossing the main load direction. Moreover, in the assembly (1c) for air spring according to the present embodiment, a degree of freedom in selecting a material of the adjusting member (30) is increased.

(5) In the assembly (1, 1a, 1c, 1d, 1e) for air spring according to the one embodiment of the present invention, the outer annular stopper (40a) may have a stack in which an elastic body (41) and an hard member (42) are stacked alternately.

This leads to improved rigidity of the outer annular stopper (40a) in the main load direction, whereby the outer annular stopper (40a) can support a large load in the main load direction.

(6) In the assembly (1c) for air spring according to the one embodiment of the present invention, the hard member (42) may have an inclination portion (42c) that provides resistance against deformation of the outer annular stopper (40a) in a direction in which the adjusting member (30) is connected to the first supporting member (10) and the second supporting member (20).

The inclination portion (42c) provides the outer circumferential stopper (40a) with an anisotropic elastic property (spring property) in the plane crossing the main load direction. In the plane crossing the main load direction, the assembly (1c) for air spring according to the one embodiment of the present invention has not only anisotropy in elastic property (spring property) of the adjusting member (30) but also anisotropy in elastic property (spring property) of the outer annular stopper (40a). Accordingly, the assembly (1c) for air spring in the present embodiment can have large anisotropy in spring property in the plane crossing the main load direction. Moreover, in the assembly (1c) for air spring according to the present embodiment, a degree of freedom in selecting a material of the adjusting member (30) is increased.

(7) In the assembly (1) for air spring according to the one embodiment of the present invention, a recess (40c) may be provided at a portion of an inner side of the outer annular stopper (40a), and at least a portion of the adjusting member (30) may extend into the recess (40c).

Since at least a portion of the adjusting member (30) extends into the recess (40c), the elastic member included in the adjusting member (30) can be long. This leads to an increased anisotropy in spring property of the assembly (1) for air spring in the plane crossing the main load direction. The life of the adjusting member (30) can be increased. The tolerable displacement of adjusting member (30) can be increased.

Since at least a portion of the adjusting member (30) extends into the recess (40c), the outer shape of the outer annular stopper (40a) can be small. This leads to a small size of the assembly (1) for air spring in the plane crossing the main load direction.

(8) In the assembly (1, 1a, 1b, 1c, 1d, 1e) for air spring according to the one embodiment of the present invention, the outer annular stopper (40a) may have a substantially isotropic shape in the plane crossing the main load direction.

Since the outer annular stopper (40a) has an substantially isotropic shape in the plane crossing the main load direction, an outer annular stopper (40a) having such a substantially isotropic shape and having been conventionally used can be used without any modification. Accordingly, the manufacturing cost of the assembly (1) for air spring can be suppressed from being increased.

The outer annular stopper (40a) having the substantially isotropic shape has higher rigidity than that of the outer annular stopper (40a) having the recess (40c) formed therein. Hence, even when stress is applied to the outer annular stopper (40a) having no recess (40c) and having the substantially isotropic shape, the outer annular stopper (40a) is unlikely to buckle.

(9) In the assembly (1b) for air spring according to the one embodiment of the present invention, the outer cylinder (40b) may include a supporting pillar (43) and a sliding member (44). The sliding member (44) may be provided between the second supporting member (20) and the supporting pillar (43).

Since the rigidity of the supporting pillar (43) is larger than that of the outer annular stopper (40a) having the elastic member, the width of the supporting pillar (43) in the plane crossing the main load direction can be narrower than that of the outer annular stopper (40a) in the plane crossing the main load direction. Accordingly, the elastic member included in the adjusting member (30) can be long, thereby attaining large anisotropy in spring property of the assembly (1b) for air spring in the plane crossing the main load direction.

(10) The assembly (1, 1b, 1c, 1d, 1e) for air spring according to the one embodiment of the present invention may further comprise an inner annular stopper (45) having an elastic member, wherein at least a portion of the inner annular stopper (45) may extend to an inner space of the outer cylinder (40, 40b).

During deflation, in which a diaphragm (60) loses air pressure and is collapsed, the vehicle body of the vehicle is supported by the inner annular stopper (45). Thus, loss of a cushion property of the diaphragm (60) caused by the deflation is compensated with the elastic property (spring property) of the inner annular stopper (45). Accordingly, even during the deflation, it is possible to secure traveling safety of the vehicle and riding comfort involving little displeasure.

Since the inner annular stopper (45) extends to the inner space of the outer cylinder (40, 40b), the inner annular stopper (45) can be incorporated into the assembly (1, 1b, 1c, 1d, 1e) for air spring without increasing the size of the assembly (1, 1b, 1c, 1d, 1e) for air spring in the main load direction and the direction crossing the main load direction.

(11) In the assembly (1, 1b, 1c, 1d, 1e) for air spring according to the one embodiment of the present invention, the first supporting member (10) may include a carriage side spigot (12), and the adjusting member (30) may be connected to the carriage side spigot (12) and the second supporting member (20).

Accordingly, the adjusting member (30) can be incorporated in the space around the carriage side spigot (12), whereby the adjusting member (30) can be incorporated in the assembly (1, 1b, 1c, 1d, 1e) for air spring without increasing the size of the assembly (1, 1b, 1c, 1d, 1e) for air spring.

(12) In the assembly (1, 1a, 1b, 1e, 1d, 1e) for air spring according to the one embodiment of the present invention, at least one of the first supporting member (10) and the second supporting member (20) may include a wall (13, 24), and the adjusting member (30) may be connected to the wall (13, 24).

Accordingly, the adjusting member (30) can be readily provided between the first supporting member (10) and the second supporting member (20).

(13) In the assembly (1, 1a, 1b, 1c, 1d, 1e) for air spring according to the one embodiment of the present invention, the adjusting member (30) may include an elastic member provided in a direction in which the adjusting member (30) is connected to the first supporting member (10) and the second supporting member (20).

When stress is applied to the assembly (1, 1a, 1b, 1c, 1d, 1e) for air spring in the direction in which the adjusting member (30) is connected to the first supporting member (10) and the second supporting member (20), the elastic property (spring property) of the elastic member of the adjusting member (30) has a large influence over the elastic property (spring property) of the assembly (1, 1a, 1b, 1c, 1d, 1e) for air spring. Accordingly, with the elastic member of the adjusting member (30) thus provided, it is possible to locally change the elastic property (spring property) of the assembly (1, 1a, 1b, 1c, 1d, 1e) for air spring in the plane crossing the main load direction. Thus, the assembly (1, 1a, 1b, 1c, 1d, 1e) for air spring can be implemented with a simple configuration to have anisotropy in spring property in the plane crossing the main load direction. Moreover, the spring property of the assembly (1, 1a, 1b, 1c, 1d, 1e) for air spring can be adjusted anisotropically in the plane crossing the main load direction, without providing a large influence over the spring property of the assembly (1, 1a, 1b, 1c, 1d, 1e) for air spring in the main load direction.

(14) In the assembly (1, 1a, 1b, 1c, 1d, 1e) for air spring according to the one embodiment of the present invention, the elastic member may have a stack in which a plurality of elastic bodies (31) are stacked in the direction in which the adjusting member (30) is connected to the first supporting member (10) and the second supporting member (20).

By employing such a stack as the adjusting member (30), the elastic property (spring property) of the adjusting member (30) in the direction in which the adjusting member (30) is connected to the first supporting member (10) and the second supporting member (20) can be readily different from the elastic property (spring property) of the adjusting member (30) in the direction crossing the direction in which the adjusting member (30) is connected to the first supporting member (10) and second supporting member (20) in the plane crossing the main load direction.

(15) An air spring (2, 2a, 2b, 2c, 2d, 2e) according to one embodiment of the present invention includes: the assembly (1, 1a, 1b, 1c, 1d, 1e) for air spring according to any one of (1) to (14); a third supporting member (50); and an elastically deformable diaphragm (60) that forms a closed space (S) by connecting the second supporting member (20) and the third supporting member (50) to each other.

Accordingly, the air spring (2, 2a, 2b, 2c, 2d, 2e) can have different spring properties to stresses in the plane crossing the main load direction, depending on a relation between the elastic property (spring property) of the adjusting member (30) and directions of the stresses. Accordingly, there can be provided the air spring (2, 2a, 2b, 2c, 2d, 2e), which has anisotropy in spring property in the plane crossing the main load direction.

(16) in the air spring (2d, 2e) according to the one embodiment of the present invention, the third supporting member (50) may have a cover (53, 80) that restricts movement of the diaphragm (60) in the direction in which the adjusting member (30) is connected to the first supporting member (10) and the second supporting member (20).

The cover (53, 80) provides the diaphragm (60) with an anisotropic spring property in the plane crossing the main load direction. The air spring (2d, 2e) according to the present embodiment has not only anisotropy in elastic property (spring property) of the adjusting member (30) but also anisotropy in spring property of the diaphragm (60) in the plane crossing the main load direction. Accordingly, the air spring (2d, 2e) according to the one embodiment of the present invention can have large anisotropy in spring property in the plane crossing the main load direction. Moreover, in the air spring (2d, 2e) according to the one embodiment of the present invention, a degree of freedom in selecting a material of the adjusting member (30) is increased.

(17) A carriage (70) for vehicle according to one embodiment of the present invention includes the assembly (1, 1a, 1b, 1c, 1d, 1e) for air spring according to any one of (1) to (14), the air spring (2, 2a, 2b, 2c, 2d, 2e) according to (15), or the air spring (2d, 2e) according to (16).

Accordingly, there can be provided the carriage (70) for vehicle, which has anisotropy in spring property in the plane crossing the main load direction.

Details of Embodiments of the Present Invention

Next, details of the embodiments of the present invention will be described.

First Embodiment

With reference to FIG. 1 to FIG. 7, the following describes an assembly 1 for air spring and an air spring 2 according to a first embodiment. In FIG. 1 to FIG. 7, it is defined that a vertical direction is a z direction, a longitudinal direction parallel to the straight traveling direction of the vehicle is a y direction, and a lateral direction orthogonal to the y direction and the z direction is an x direction. Since air spring 2 is provided between a vehicle body and a carriage of the vehicle, the load of the vehicle body is exerted onto air spring 2 mainly in the vertical direction (z direction). Hence, in the present specification, it is defined that a main load direction is a direction in which the load of the vehicle body is mainly exerted onto air spring 2. In the first embodiment, the main load direction is substantially parallel to the vertical direction (z direction), and a plane crossing the main load direction is a horizontal plane (xy plane).

Figure 2:
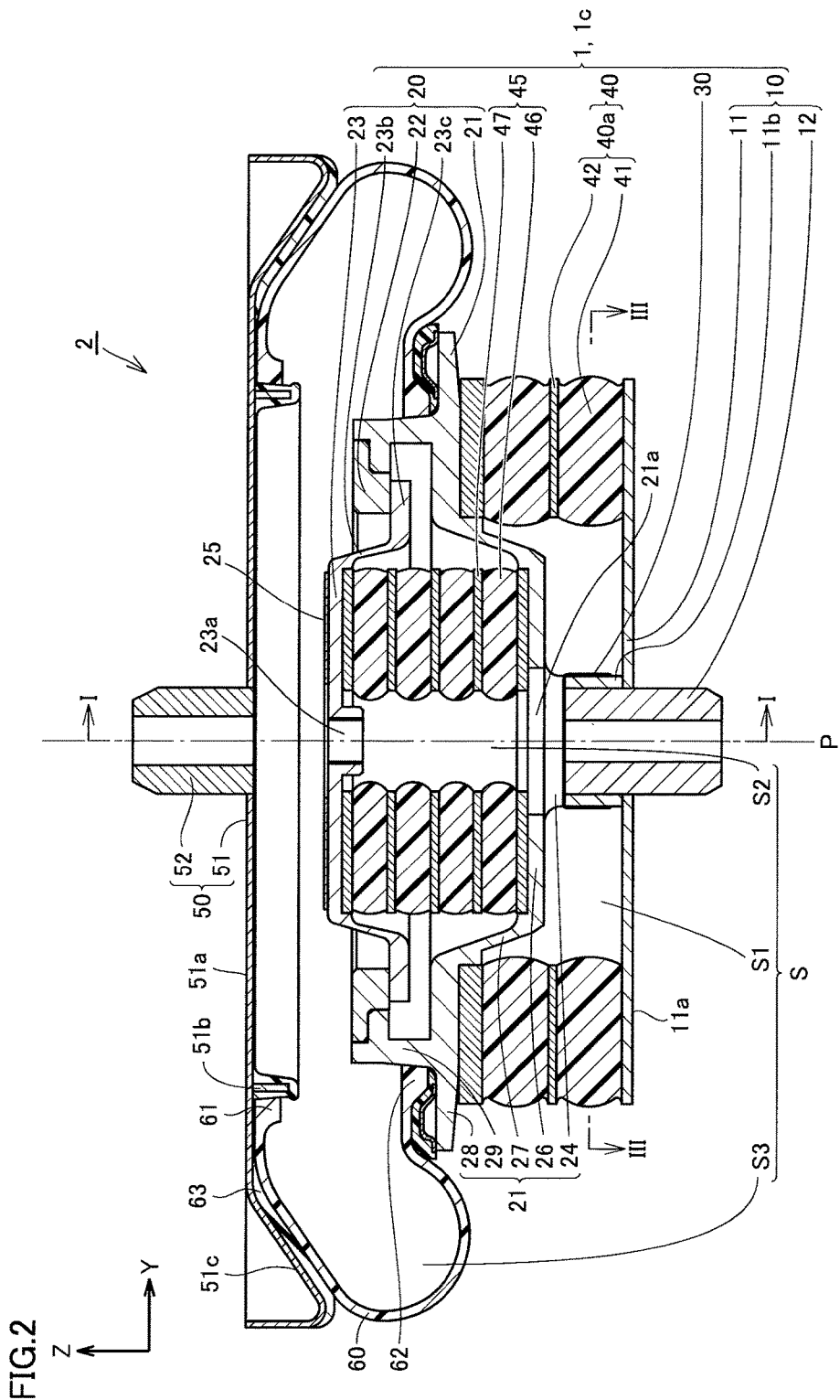
FIG. 2 is a schematic cross sectional view of the air spring according to the first embodiment of the present invention in a longitudinal direction, and is a schematic cross sectional view along a cross sectional line II-II shown in FIG. 1 and FIG. 3.
Figure 3:
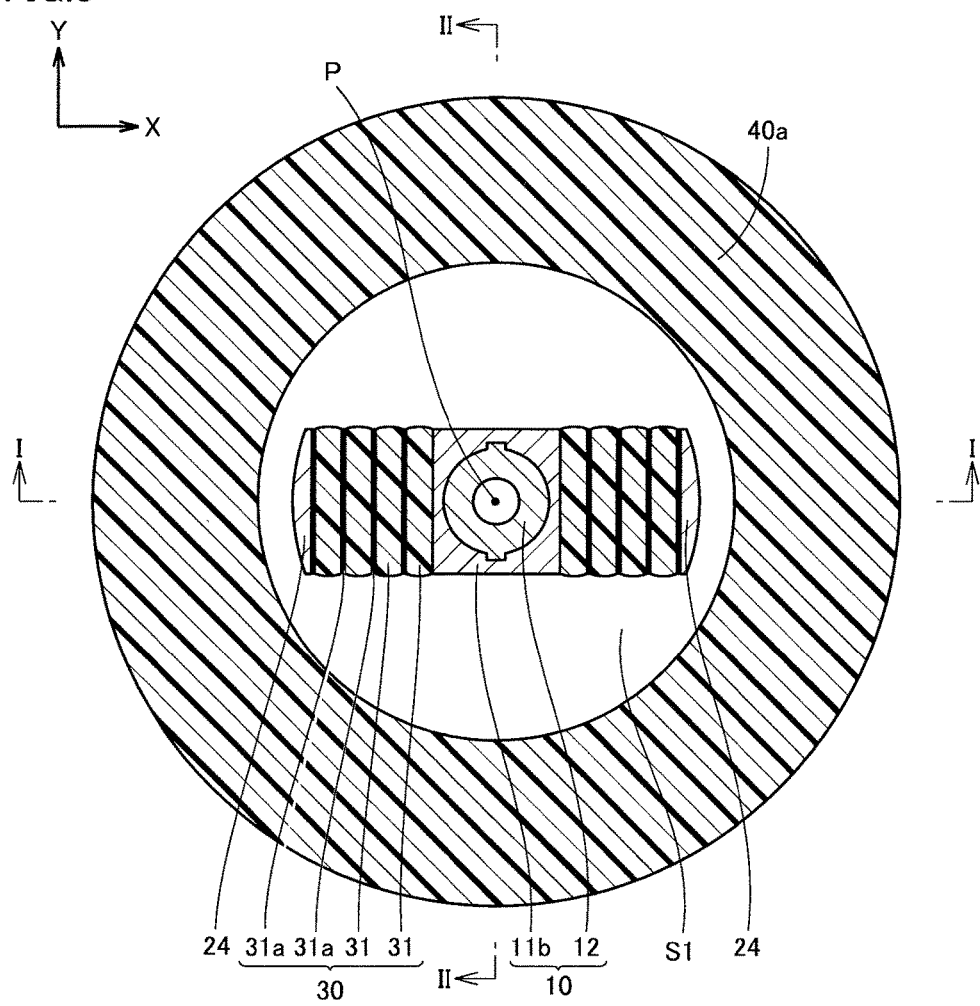
FIG. 3 is a schematic cross sectional view of the air spring according to the first embodiment of the present invention along a cross sectional line III-III shown in FIG. 1 and FIG. 2.

With reference to FIG. 1 to FIG. 3, the following describes assembly 1 for air spring in the first embodiment when no load is applied in the plane (xy plane; horizontal plane) crossing the main load direction. In the first embodiment, assembly 1 for air spring is assembled on the carriage 70 side of a diaphragm 60, and is one of members included in air spring 2 (see FIG. 9).

Assembly 1 for air spring in the first embodiment mainly comprises a first supporting member 10, a second supporting member 20, an adjusting member 30, an outer cylinder 40, and an inner annular stopper 45.

First supporting member 10 mainly has a lower plate 11, an inside boss 11b, and a carriage side spigot 12.

Lower plate 11 has a circular shape having its center on a center axis P when viewed from the lower surface 11a side, for example. The shape of lower plate 11 when-viewed from the lower surface 11a side is not limited to the circular shape, and may be, for example, a rectangular shape, a shape of petal, or a shape in which a portion of the outer circumferential portion projects in the plane crossing the main load direction.

Inside boss 11b, which is hollow, is attached to lower plate 11 in the vicinity of axis P so as to have its central axis on axis P and project from lower plate 11 to a side opposite to lower surface 11a. With reference to FIG. 3, in the first embodiment, inside boss 11b has an inner circumference having a substantially circular cross sectional shape, and has an outer circumference having a rectangular cross sectional shape. The outer circumference of inside boss 11b has a flat surface substantially orthogonal to the lateral direction (x direction). It should be noted that the cross sectional shape of the outer circumference of inside boss 11b is not limited to the rectangular shape, and may be a different shape such as a hexagonal shape.

Carriage side spigot 12, which has a cylindrical shape, is provided on lower plate 11 in the vicinity of axis P so as to have its central axis on axis P and project from lower plate 11 in the main load direction. Carriage side spigot 12 is fixed to lower plate 11. A portion of carriage side spigot 12 projecting from lower plate 11 to the side opposite to lower surface 11a is accommodated in inside boss 11b and is fixed to inside boss 11b. Lower plate 11 is connected to the carriage via carriage side spigot 12. It should be noted that carriage side spigot 12 is not limited to the cylindrical shape and may have a different shape such as a rectangular shape.

Outer cylinder 40 is provided on lower plate 11 to share axis P when no load is applied onto air spring 2 in the plane (xy plane; horizontal plane) crossing the main load direction. In the first embodiment, outer cylinder 40 extends in the main load direction and has a substantially isotropic shape in the plane crossing the main load direction, such as a cylindrical shape. In the present specification, the term "substantially isotropic shape" is intended to indicate a shape not having anisotropy intentionally introduced therein, such as a shape having a portion provided with a recess. Outer cylinder 40 supports second supporting member 20, inner annular stopper 45, diaphragm 60, and a third supporting member 50 as described below.

In the first embodiment, outer cylinder 40 includes an outer annular stopper 40a having an elastic member. Specifically, in the first embodiment, outer annular stopper 40a includes: a plurality of elastic bodies 41 made of rubber or the like; and at least one hard member 42 made of metal or the like. Outer annular stopper 40a has a structure in which elastic bodies 41 and hard member 42 are alternately stacked in the main load direction. This leads to improved rigidity of outer annular stopper 40a in the plane crossing the main load direction, whereby outer annular stopper 40a can support a large load in the main load direction. Each of elastic bodies 41 extends in the main load direction, and has a substantially isotropic shape in the plane crossing the main load direction, such as a cylindrical shape. Hard member 42 has a substantially isotropic shape in the plane crossing the main load direction, such as a disc shape having a hole at the center thereof. Outer annular stopper 40a may be constituted of a single elastic body 41 without having hard member 42. Outer annular stopper 40a supports second supporting member 20, inner annular stopper 45, diaphragm 60, and third supporting member 50 as described below.

Second supporting member 20 mainly has an inner cylinder 21, a holding member 22, and a lower surface plate 23. Second supporting member 20 is provided to be spaced away from first supporting member 10 in the main load direction.

Inner cylinder 21 is provided to extend from the surface of outer annular stopper 40a opposite to first supporting member 10 to an inner space of outer annular stopper 40a. Inner cylinder 21 is supported on outer annular stopper 40a to share axis P when no stress is applied in the plane crossing the main load direction. Inner cylinder 21 has a substantially cylindrical shape having its center on axis P, for example. When no stress is applied in the plane crossing the main load direction, inner cylinder 21 has a through portion 21a at its central portion including axis P.

In the first embodiment, inner cylinder 21 has a first wall 24, a supporting portion 26, a first side wall 27, a flange portion 28, and an upper wall 29. When no stress is applied in the plane crossing the main load direction, supporting portion 26 has through portion 21a at its central portion including axis P. Supporting portion 26 supports inner annular stopper 45 mentioned later. At the end portion of supporting portion 26 in the lateral direction (x direction), first wall 24 is provided to extend in the direction of lower plate 11. First wall 24 is provided to face inside boss 11b in the lateral direction (x direction). First side wall 27 extends from the outer edge of supporting portion 26 in the direction opposite to lower plate 11 so as to be gradually separated away from axis P. In the plane (xy plane; horizontal plane) crossing the main load direction, flange portion 28 extends from the end portion of first side wall 27 opposite to supporting portion 26 in the direction of separating away from axis P. Flange portion 28 is connected to outer annular stopper 40a. Upper wall 29 extends from substantially the central portion of the upper surface of flange portion 28 in the direction opposite to lower plate 11.

Lower surface plate 23 is provided at the side opposite to the first supporting member 10 side relative to inner cylinder 21 so as to share axis P when no stress is applied in the plane crossing the main load direction. Lower surface plate 23 is connected to the upper end portion of upper wall 29 of inner cylinder 21 via holding member 22. When no stress is applied in the plane crossing the main load direction, lower surface plate 23 has a through portion 23a at its central portion including axis P. Lower surface plate 23 has a circular shape having its center on central axis P when viewed from the side opposite to first supporting member 10, for example. The shape of lower surface plate 23 when viewed from the side opposite to first supporting member 10 is not limited to the circular shape, and may be, for example, a rectangular shape, a shape of petal, or a shape in which a portion of the outer circumferential portion projects in the plane crossing the main load direction.

Lower surface plate 23 has a second side wall 23b extending to the first supporting member 10 side, and has a recessed shape having a recess at the first supporting member 10 side. Lower surface plate 23 has a flange portion 23c extending from the end portion of second side wall 23b in the direction of separating away from axis P in the plane (xy plane; the horizontal plane) crossing the main load direction. Flange portion 23c of lower surface plate 23 is connected to inner cylinder 21 by holding member 22. Specifically, flange portion 23c of lower surface plate 23 is connected to upper wall 29 of inner cylinder 21 by holding member 22.

A fluorine-based resin film 25 is provided on the surface of lower surface plate 23 opposite to first supporting member 10. Fluorine-based resin film 25 can reduce frictional resistance caused by contact between lower surface plate 23 and a below-described upper surface plate 51 during deflation, in which diaphragm 60 loses air pressure and is collapsed.

Inner annular stopper 45 is supported by inner cylinder 21 to share axis P when no stress is applied in the plane crossing the main load direction. In the first embodiment, inner annular stopper 45 is supported by supporting portion 26 of inner cylinder 21. Inner annular stopper 45 extends in the main load direction, and has a substantially isotropic shape in the plane crossing the main load direction, such as a cylindrical shape.

In the first embodiment, inner annular stopper 45 is arranged inside outer annular stopper 40a, and has a portion extending to an inner space of outer annular stopper 40a. Specifically, inner cylinder 21 is provided on outer annular stopper 40a such that supporting portion 26 of inner cylinder 21 is in the inner space of outer annular stopper 40a, and inner annular stopper 45 is supported by supporting portion 26 of inner cylinder 21.

Inner annular stopper 45 has an elastic member, and can be elastically deformed. In the first embodiment, inner annular stopper 45 includes: a plurality of elastic bodies 46 made of rubber or the like; and at least one hard member 47 made of metal or the like. Outer annular stopper 40a has a structure in which elastic bodies 46 and hard member 47 are alternately stacked in the main load direction. This leads to improved rigidity of inner annular stopper 45 in the plane crossing the main load direction, thereby securing riding comfort involving little displeasure. Each of elastic bodies 46 extends in the main load direction, and has a substantially isotropic shape in the plane crossing the main load direction, such as a cylindrical shape, for example. Hard member 47 has a substantially isotropic shape in the plane crossing the main load direction, such as a disc shape having a hole at the center thereof. Inner annular stopper 45 may be constituted of a single elastic body 46 without having hard member 47.

Inner annular stopper 45 is preliminarily compressed. The end portion of inner annular stopper 45 opposite to supporting portion 26 is pressed to the supporting portion 26 side by lower surface plate 23, thereby maintaining such a state that the inner annular stopper 45 is preliminarily compressed. In the first embodiment, a spring constant of inner annular stopper 45 is smaller than that of outer annular stopper 40a.

Adjusting member 30 is connected to first supporting member 10 and second supporting member 20 in the x direction (lateral direction) in the plane crossing the main load direction. The expression "adjusting member 30 is connected to first supporting member 10 and second supporting member 20" is intended to indicate that: adjusting member 30 is in direct contact with at least one of first supporting member 10 and second supporting member 20; or adjusting member 30 is connected to at least one of first supporting member 10 and second supporting member 20 via an appropriate member.

Specifically, adjusting member 30 extends in the x direction (lateral direction), and is connected to carriage side spigot 12 in first supporting member 10 and first wall 24 in second supporting member 20. The expression "adjusting member 30 is connected to carriage side spigot 12 and first wall 24" is intended to indicate that: adjusting member 30 is in direct contact with at least one of carriage side spigot 12 and first wall 24; and adjusting member 30 is connected to at least one of carriage side spigot 12 and first wall 24 via an appropriate member.

Accordingly, adjusting member 30 can be incorporated in a space around carriage side spigot 12, whereby adjusting member 30 can be incorporated in assembly 1 for air spring without increasing the size of assembly 1 for air spring. Moreover, with first wall 24, adjusting member 30 can be readily provided between first supporting member 10 and second supporting member 20.

In the first embodiment, adjusting member 30 is arranged inside outer annular stopper 40a. Accordingly, adjusting member 30 can be incorporated in assembly 1 for air spring without increasing the size of assembly 1 for air spring in the plane (xy plane; horizontal plane) crossing the main load direction.

In the first embodiment, adjusting member 30 is an elastic member extending in the x direction (lateral direction) in the plane crossing the main load direction. Accordingly, each of assembly 1 for air spring and air spring 2 can be implemented with a simple configuration to have anisotropy in spring property in the plane crossing the main load direction.

In the first embodiment, adjusting member 30 has an elastic member in which a plurality of elastic bodies 31 are stacked in the x direction (lateral direction). When stress is applied to adjusting member 30 in the x direction (lateral direction), adjusting member 30 is subject to compressive or tensile stress in the x direction (lateral direction), which results in tensile/compressive deformation of adjusting member 30 in the x direction (lateral direction). Accordingly, the elastic property of adjusting member 30 in the x direction (lateral direction) has a great influence over the spring property of assembly 1 for air spring and the spring property of air spring 2. On the other hand, when stress is applied to adjusting member 30 in the y direction (longitudinal direction), shear stress is applied to a connection portion 31a of the plurality of elastic bodies 31, which results in shear deformation of adjusting member 30 in the y direction.

There is a difference between the tensile/compressive deformation and the shear deformation in terms of deformation modes, thus resulting in a difference between the elastic property caused by the tensile/compressive deformation and the elastic property caused by the shear deformation. Accordingly, the elastic property (spring property) of adjusting member 30 in the x direction (lateral direction) is different from the elastic property (spring property) of adjusting member 30 in the y direction (longitudinal direction). In the plane crossing the main load direction, adjusting member 30 functions as a directional stopper. With adjusting member 30 thus having the elastic member in which the plurality of elastic bodies are stacked in the x direction (lateral direction), the elastic property (spring property) of adjusting member 30 in the x direction (lateral direction) and the elastic property (spring property) of adjusting member 30 in the y direction (longitudinal direction) can be different from each other readily. In the first embodiment, the spring property of assembly 1 for air spring in the direction in which adjusting member 30 is connected to first supporting member 10 and second supporting member 20, specifically, the x direction (lateral direction), is larger than the spring property of assembly 1 for air spring in other directions in the plane crossing the main load direction.

In the first embodiment, such a simple configuration including the plurality of elastic bodies stacked on one another can provide adjusting member 30 with an anisotropic elastic property in the plane crossing the main load direction. It should be noted that adjusting member 30 may have a single elastic body 31.

With reference to FIG. 1 to FIG. 3, the following describes air spring 2 in the first embodiment when no load is applied in the plane (xy plane; horizontal plane) crossing the main load direction.

Air spring 2 of the first embodiment mainly comprises assembly 1 for air spring, third supporting member 50, and diaphragm 60.

Third supporting member 50 mainly has upper surface plate 51 and a vehicle body side spigot 52.

Upper surface plate 51 mainly has a protrusion 51b and an outer circumferential portion 51c. Outer circumferential portion 51c extends in the direction of lower plate 11 so as to be gradually separated away from axis P. Outer circumferential portion 51c has a shape bent in the direction of lower plate 11. Outer circumferential portion 51c is configured in conformity with the outer shape of diaphragm 60.

Upper surface plate 51 is provided at the side opposite to the first supporting member 10 side relative to lower surface plate 23 of second supporting member 20 so as to be spaced away from lower surface plate 23 and share axis P when no load is applied to air spring 2 in the plane crossing the main load direction. Upper surface 51a of upper surface plate 51 has a circular shape having its center on axis P when viewed from the side opposite to the lower surface plate 23 side, for example. The shape of upper surface 51a of upper surface plate 51 is not limited to the circular shape, and may be, for example, a rectangular shape, a shape of petal, or a shape in which a portion of the outer circumferential portion projects in a plane crossing the main load direction.

Vehicle body side spigot 52 is attached to a region of third supporting member 50 including axis P so as to project along axis P to the side opposite to the lower surface plate 23 side. Third supporting member 50 is connected to the vehicle body (not shown) via vehicle body side spigot 52.

Diaphragm 60 connects third supporting member 50 and second supporting member 20 to each other. In the first embodiment, diaphragm 60 is provided to connect between upper surface plate 51 in third supporting member 50 and flange portion 28 in inner cylinder 21 of second supporting member 20. In the first embodiment, diaphragm 60 is connected, at a first contact portion 61 defining one opening, to protrusion 51b extending from upper surface plate 51 in the direction of lower plate 11. Diaphragm 60 is connected to flange portion 28 of inner cylinder 21 at a second contact portion 62 defining the other opening. Outer cylinder 40 supports second supporting member 20, diaphragm 60, and third supporting member 50.

Third supporting member 50, second supporting member 20, and diaphragm 60 form a space S3. Diaphragm 60 has an opening formed at the inner circumference side, and in the first embodiment, has a ring-like cylindrical shape having its center on axis P when no stress is applied in the plane crossing the main load direction. Diaphragm 60 is made of, for example, rubber and can be elastically deformed.

Upper surface plate 51 is provided its the outer circumferential portion (outer side in the plane crossing the main load direction) to cover at least a portion of diaphragm 60. In order to prevent contact between diaphragm 60 and outer circumferential portion 51c of upper surface plate 51, a buffer portion 63 is provided between diaphragm 60 and outer circumferential portion 51c of upper surface plate 51.

Inner cylinder 21, lower plate 11, and outer cylinder 40 form a space S1. Inner cylinder 21, lower surface plate 23, and inner annular stopper 45 form a space S2. Space S1 and space S2 are connected to each other via through portion 21a provided in inner cylinder 21. Space S2 and space S3 are connected to each other via through portion 23a provided in lower surface plate 23. Accordingly, space S1, space S2, and space S3 form one closed space S in air spring 2.

Air spring 2 is supplied with pressurized air from at least one of vehicle body side spigot 52 and carriage side spigot 12. During inflation (normal state) in which the pressurized air is sealed in diaphragm 60, diaphragm 60 has an air cushion effect. When air spring 2 is horizontally displaced during the inflation, outer annular stopper 40a is elastically deformed to assist the horizontal movement of diaphragm 60.

On the other hand, during deflation, in which a diaphragm 60 loses air pressure and is collapsed, inner annular stopper 45 supports upper surface plate 51 via lower surface plate 23, thereby supporting the vehicle body of the vehicle via inner annular stopper 45 and outer annular stopper 40a. Accordingly, loss of the cushion property of diaphragm 60 caused by the deflation is compensated with the elastic property of outer annular stopper 40a and the elastic property of inner annular stopper 45. Accordingly, even during the deflation, it is possible to secure traveling safety of the vehicle and riding comfort involving little displeasure.

Figure 6:
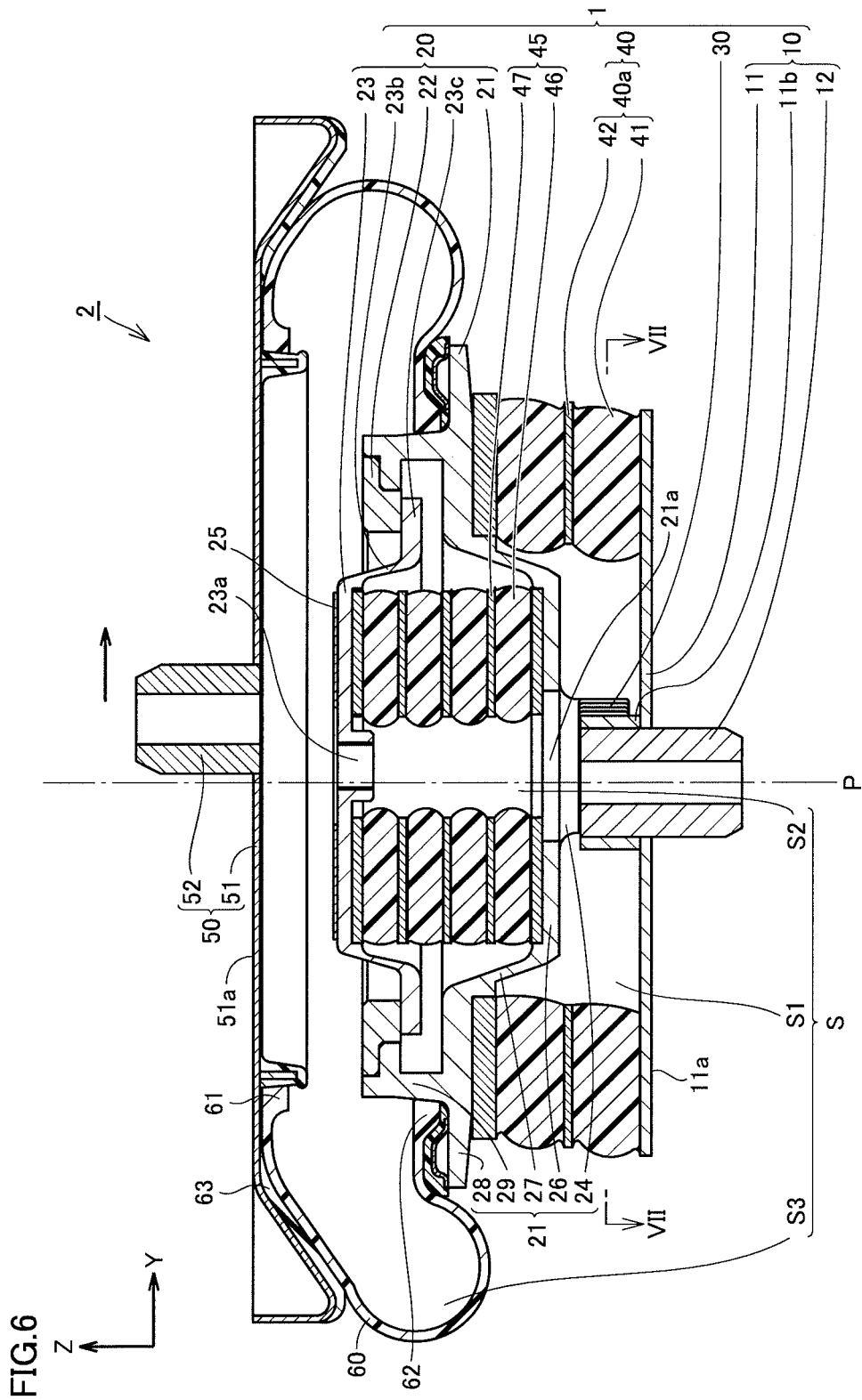
FIG. 6 is a schematic cross sectional view for illustrating an operation of the air spring according to the first embodiment of the present invention in the longitudinal direction.
Figure 7:
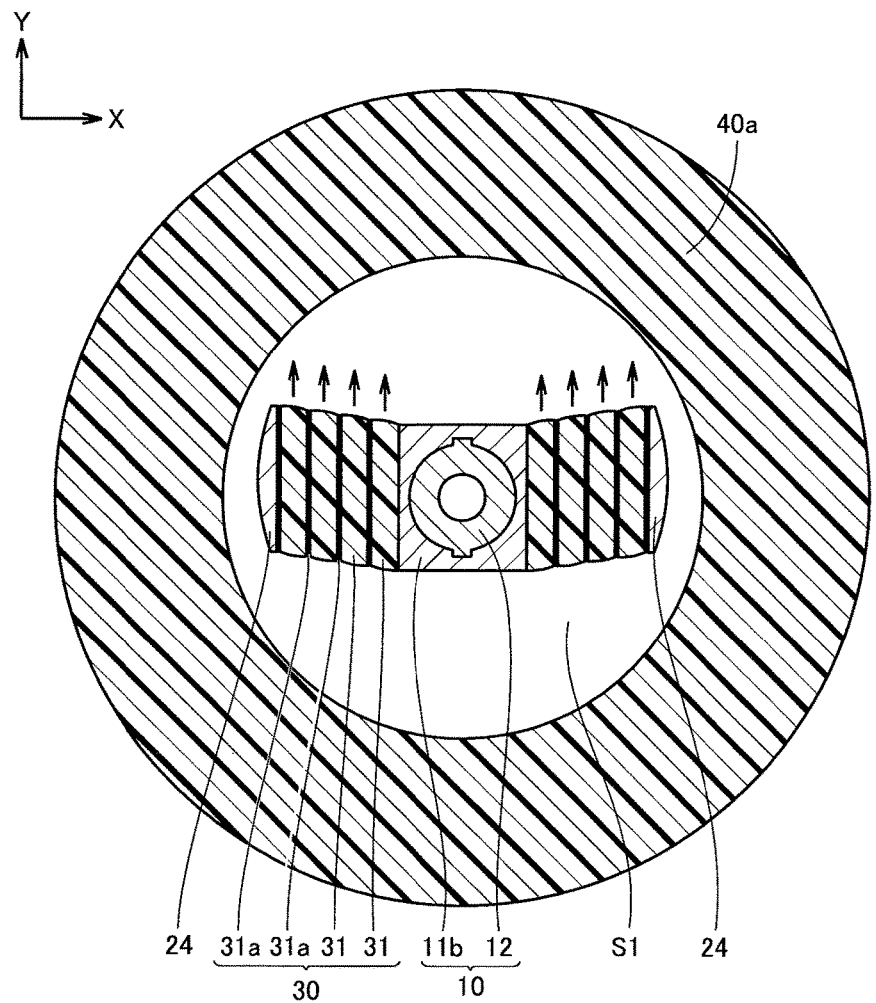
FIG. 7 is a schematic cross sectional view of the air spring according to the first embodiment of the present invention along a cross sectional line VII-VII shown in FIG. 6.
Figure 8:
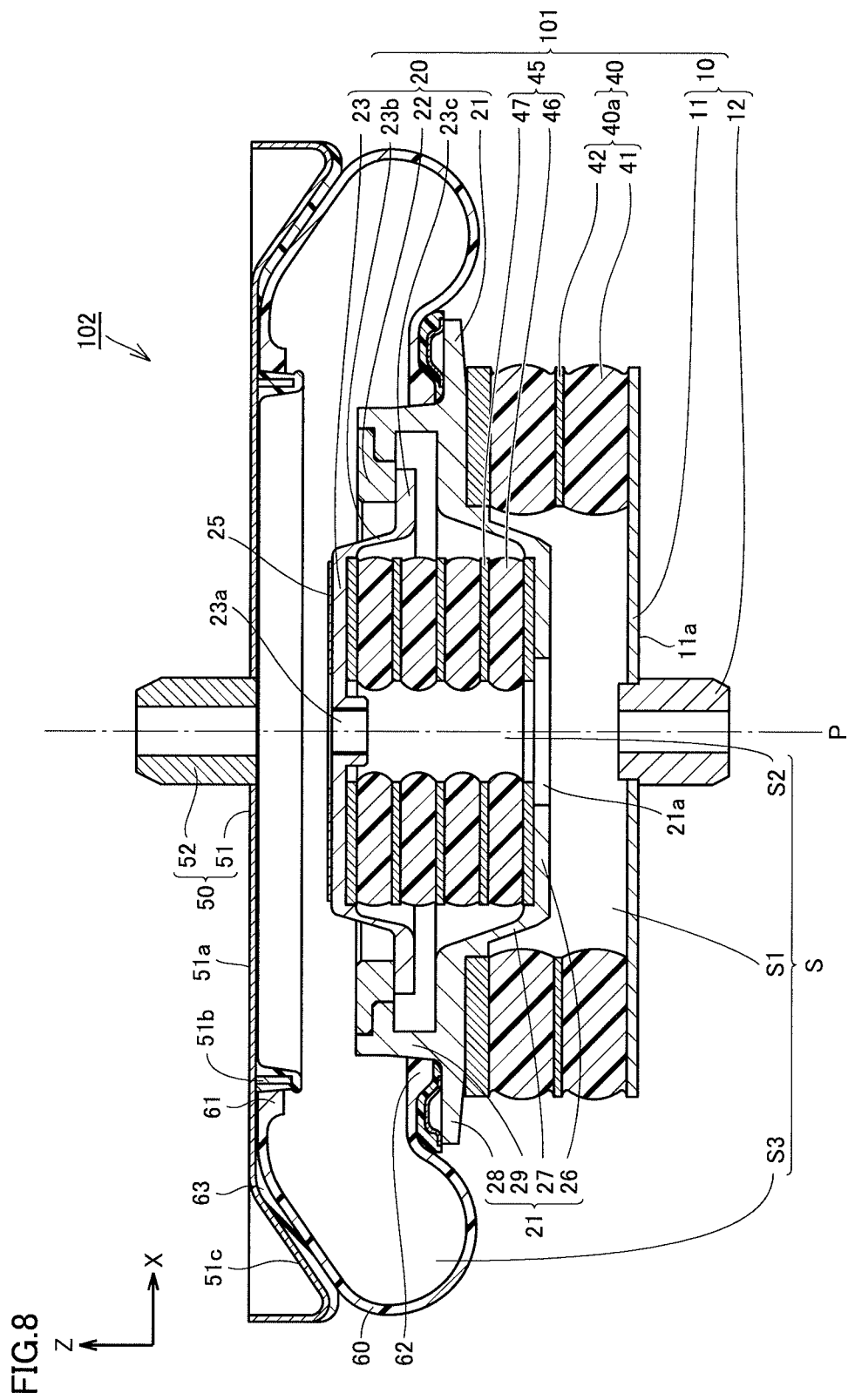
FIG. 8 is a schematic cross sectional view of an air spring according to a comparative example in the lateral direction.

Next, with reference to FIG. 1 to FIG. 7, the following describes function and effect with regard to assembly 1 for air spring and air spring 2 in the first embodiment in comparison with an assembly 101 for air spring and an air spring 102 in a comparative example as shown in FIG. 8.

With reference to FIG. 8, in comparison with assembly 1 for air spring and air spring 2 according to the first embodiment as shown in FIG. 1 to FIG. 3, assembly 101 for air spring and air spring 102 in the comparative example has a configuration not provided with adjusting member 30 and first wall 24. It should be noted that since the configuration of the comparative example other than these is substantially the same as that of the first embodiment shown in FIG. 1, the same elements are given the same reference characters and are not the described repeatedly.

The spring property of assembly 101 for air spring in the comparative example is determined mainly by the elastic property of outer annular stopper 40a and the elastic property of inner annular stopper 45. The spring property of air spring 102 in the comparative example is mainly determined by the spring property of assembly 101 for air spring and the spring property of diaphragm 60. The elastic property of outer annular stopper 40a, the elastic property of inner annular stopper 45, and the spring property of diaphragm 60 are each isotropic in the plane (xy plane; horizontal plane) crossing the main load direction. Accordingly, each of assembly 101 for air spring and air spring 102 in the comparative example cannot have anisotropy in spring property in the plane crossing the main load direction.

On the other hand, in the first embodiment shown in FIG. 1 to FIG. 7, first supporting member 10 and second supporting member 20 are connected to each other by adjusting member 30 having the anisotropic elastic property in the plane crossing the main load direction. Accordingly, assembly 1 for air spring and air spring 2 according to the first embodiment can have anisotropy in spring property in the plane crossing the main load direction.

When load is applied to assembly 1 for air spring and air spring 2 in the plane crossing the main load direction, outer annular stopper 40a, the load in the plane crossing the main load direction is applied to adjusting member 30, and diaphragm 60 included in assembly 1 for air spring as well. Accordingly, stress is applied to outer annular stopper 40a, adjusting member 30, and diaphragm 60 in the plane crossing the main load direction, thereby causing elastic deformation. As a result, in the plane crossing the main load direction, second supporting member 20 and third supporting member 50 are moved relative to first supporting member 10 via outer annular stopper 40a, adjusting member 30, and diaphragm 60.

Even when load is applied to assembly 1 for air spring and air spring 2 in the plane crossing the main load direction to move the center of gravity of each of second supporting member 20, inner annular stopper 45, diaphragm 60, and third supporting member 50 in the plane crossing the main load direction, outer annular stopper 40a does not buckle at least while the center of gravity of each of second supporting member 20, inner annular stopper 45, diaphragm 60, and third supporting member 50 is on a region surrounded by the outer circumference of outer annular stopper 40a, thereby supporting second supporting member 20, inner annular stopper 45, diaphragm 60, and third supporting member 50.

Figure 4:
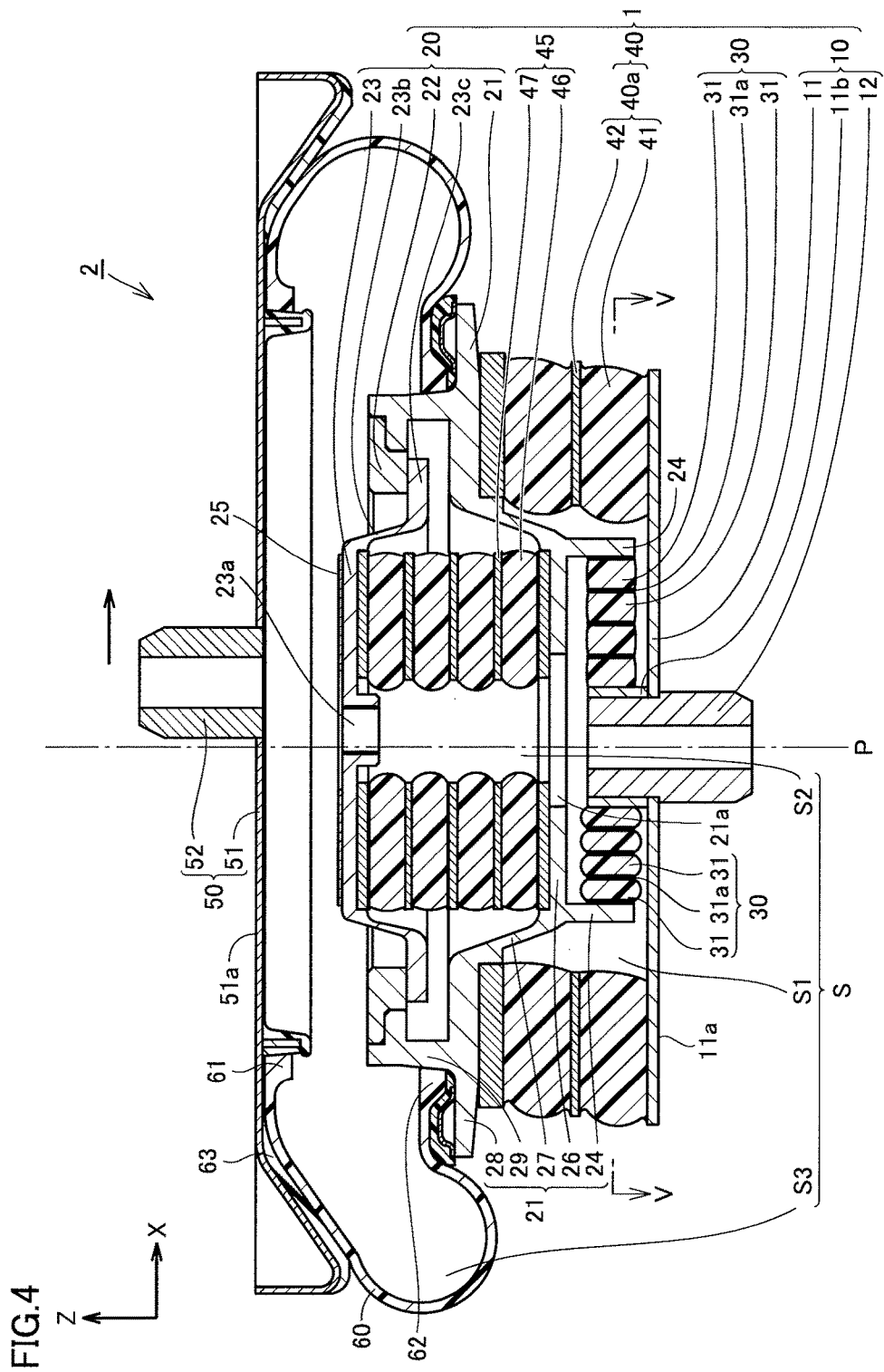
FIG. 4 is a schematic cross sectional view for illustrating an operation of the air spring according to the first embodiment of the present invention in the lateral direction.
Figure 5:
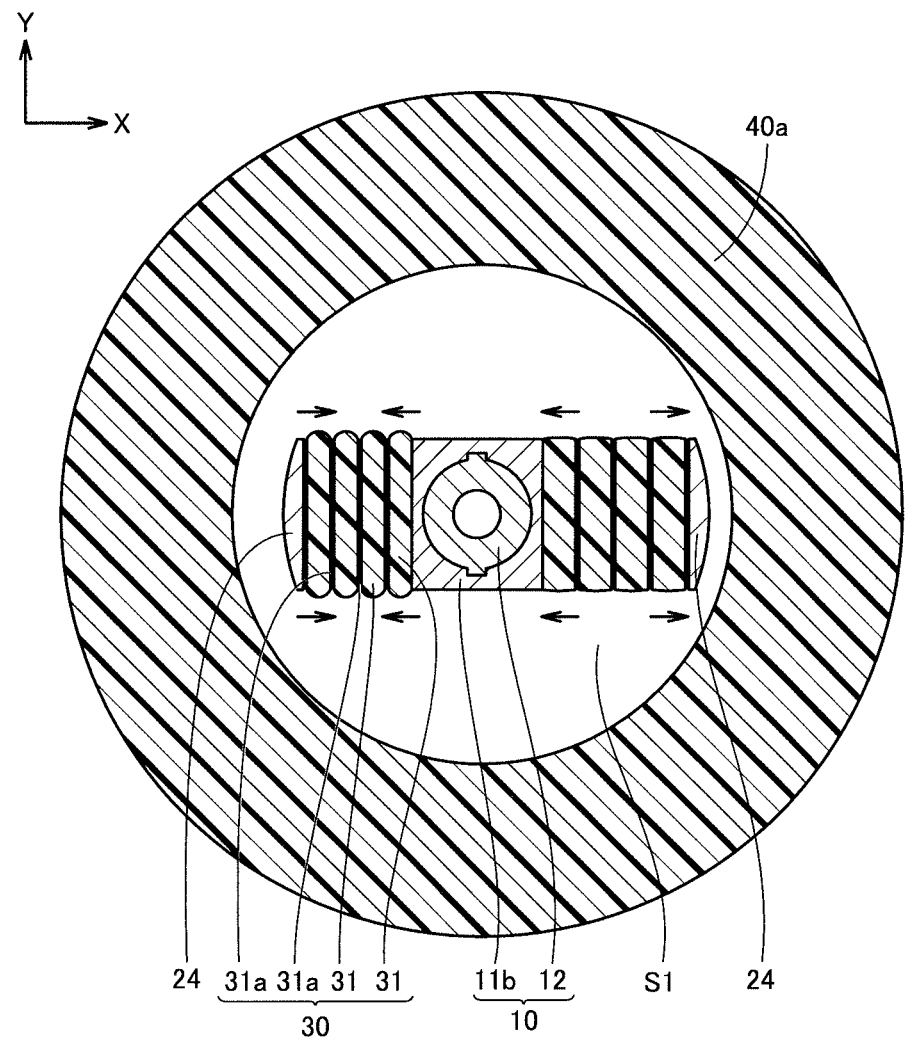
FIG. 5 is a schematic cross sectional view of the air spring according to the first embodiment of the present invention along a cross sectional line V-V shown in FIG. 4.

As shown in FIG. 4 and FIG. 5, when stress is applied in the direction in which adjusting member 30 is connected to first supporting member 10 and second supporting member 20, specifically, the x direction (lateral direction), adjusting member 30 including the plurality of elastic bodies 31 stacked in the x direction (lateral direction) has tensile/compressive deformation in the direction in which adjusting member 30 is connected to first supporting member 10 and second supporting member 20, specifically, the x direction (lateral direction).

On the other hand, as shown in FIG. 6 and FIG. 7, when stress is applied in the direction crossing the direction in which adjusting member 30 is connected to first supporting member 10 and second supporting member 20, specifically, the y direction (longitudinal direction), shear stress is applied to connection portion 31a of the plurality of elastic bodies 31, with the result that adjusting member 30 has shear deformation in the direction crossing the direction in which adjusting member 30 is connected to first supporting member 10 and second supporting, member 20, specifically, the y direction (longitudinal direction).

There is a difference between the tensile/compressive deformation and the shear deformation in terms of deformation modes, thus resulting in a difference between the elastic property (spring property) caused by the tensile/compressive deformation and the elastic property (spring property) caused by the shear deformation. Accordingly, the spring property of assembly 1 for air spring and the spring property of air spring 2 when subjected to stress in the direction in which adjusting member 30 is connected to first supporting member 10 and second supporting member 20, specifically, the x direction (lateral direction), are different from the spring property of assembly 1 for air spring and the spring property of air spring 2 when subjected to stress in the direction crossing the direction in which adjusting member 30 is connected to first supporting member 10 and second supporting member 20, specifically, the y direction (longitudinal direction). For example, in the first embodiment, the spring property of assembly 1 for air spring and the spring property of air spring 2 in the direction in which adjusting member 30 is connected to first supporting member 10 and second supporting member 20 are the largest in the plane crossing the main load direction. Hence, there can be provided assembly 1 for air spring and air spring 2, each of which has anisotropy in spring property in the plane (xy plane; horizontal plane) crossing the main load direction.

In the first embodiment, adjusting member 30 has the elastic member provided in the direction in which adjusting member 30 is connected to first supporting member 10 and second supporting member 20. Accordingly, when load is applied to assembly 1 for air spring or air spring 2 in the direction in which adjusting member 30 is connected to first supporting member 10 and second supporting member 20, the elastic property (spring property) of the elastic member of adjusting member 30 has a great influence over the elastic property (spring property) of assembly 1 for air spring and the elastic property (spring property) of air spring 2.

On the other hand, when load is applied to assembly 1 for air spring or air spring 2 in the direction crossing the direction in which adjusting member 30 is connected to first supporting member 10 and second supporting member 20, the elastic property (spring property) of the elastic member of adjusting member 30 has no great influence over the elastic property (spring property) of assembly 1 for air spring and the elastic property (spring property) of air spring 2.

Accordingly, by providing the elastic member of adjusting member 30, it is possible to locally change the elastic property (spring property) of assembly 1 for air spring and the elastic property (spring property) of air spring 2 in the plane crossing the main load direction. Assembly 1 for air spring can be implemented with a simple configuration to have anisotropy in spring property in the plane crossing the main load direction. Moreover, the spring property of assembly 1 for air spring and the spring property of air spring 2 can be adjusted anisotropically in the plane (xy plane; horizontal plane) crossing the main load direction without a great influence over the spring property of assembly 1 for air spring and the spring property of air spring 2 in the main load direction.

In the first embodiment, adjusting member 30 is arranged inside outer annular stopper 40a. Accordingly, adjusting member 30 can be incorporated in assembly 1 for air spring and air spring 2 without increasing the size of each of assembly 1 for air spring and air spring 2 in the plane (xy plane; horizontal plane) crossing the main load direction. It should be noted that when the size of each of assembly 1 for air spring and air spring 2 in the direction crossing the main load direction does not matter, adjusting member 30 may be arranged outside outer annular stopper 40a.

In the first embodiment, at least a portion of inner annular stopper 45 extends to the inner space of outer cylinder 40. Specifically, a portion of inner annular stopper 45 extends to the inner space of outer annular stopper 40a. Accordingly, inner annular stopper 45 can be incorporated into assembly 1 for air spring and air spring 2 without increasing the size of each of assembly 1 for air spring and air spring 2 in the main load direction and the direction crossing the main load direction.

In the first embodiment, outer annular stopper 40a has a substantially isotropic shape in the plane crossing the main load direction, such as a cylindrical shape. Accordingly, outer annular stopper 40a having an isotropic shape, which has been conventionally used, can be used without any modification, thereby suppressing increase of manufacturing cost of assembly 1 for air spring and air spring 2.

In an outer annular stopper 40a of a seventh embodiment (see FIG. 16), the thickness of outer annular stopper 40a is thin in a direction in which a recess 40c is formed, such as the lateral direction (x direction). This leads to low rigidity of outer annular stopper 40a. Accordingly, for example, if load is applied to outer annular stopper 40a of the seventh embodiment in the main load direction when outer annular stopper 40a of the seventh embodiment is deformed in the direction crossing the main load direction, outer annular stopper 40a is likely to buckle. On the other hand, outer annular stopper 40a having the substantially isotropic shape in the first embodiment has higher rigidity than that of outer annular stopper 40a having recess 40c formed in the seventh embodiment. Accordingly, if load is applied to outer annular stopper 40a of the first embodiment in the main load direction when outer annular stopper 40a of the first embodiment is deformed in the direction crossing the main load direction, outer annular stopper 40a of the first embodiment is unlikely to buckle.

Figure 9:
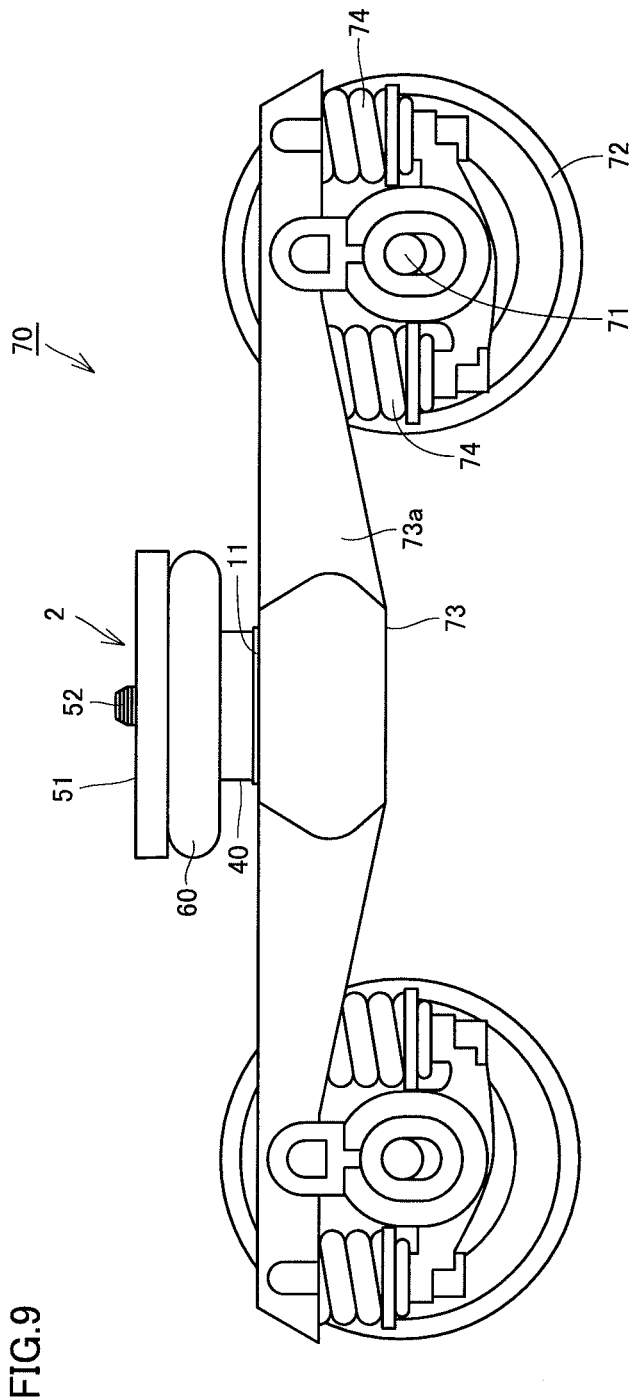
FIG. 9 is a schematic side view of a carriage for vehicle according to the first embodiment of the present invention.

FIG. 9 shows a schematic side view of a carriage 70 for vehicle such as a railroad vehicle, which includes assembly 1 for air spring or air spring 2 according to the first embodiment. Air spring 2 includes assembly 1 for air spring and diaphragm 60. In the first embodiment, assembly 1 for air spring is assembled on the carriage 70 side of diaphragm 60 and is one of the members included in air spring 2. With reference to FIG. 9, carriage 70 has a carriage frame 73 having axles 71 and wheels 72 attached thereto. Carriage frame 73 includes a side beam 73a. Carriage frame 73 is supported by axles 71 via axle springs 74. Lower plate 11 of air spring 2 is fixed to carriage frame 73 via carriage side spigot 12 (see FIG. 1), whereby air spring 2 is installed in carriage frame 73. Upper surface plate 51 of air spring 2 is fixed to the vehicle body (not shown) of the vehicle via vehicle body side spigot 52, whereby air spring 2 is fixed to the vehicle body of the vehicle. Air spring 2 is provided between carriage 70 and the vehicle body as a suspension. Carriage 70 includes assembly 1 for air spring or air spring 2, each of which has anisotropy in spring property in the plane crossing the main load direction, whereby there can be provided a carriage for vehicle having an anisotropic spring property in the plane crossing the main load direction.

It should be noted that the same effect is apparently obtained when the first embodiment is modified as illustratively described below.

For example, the cross sectional shape of the outer circumference of carriage side spigot 12 is not limited to the circular shape and may be a rectangular shape, a hexagon shape, or the like. Moreover, carriage side spigot 12 can be also configured not to project in the direction opposite to lower surface 11a when viewed from lower plate 11.

Inside boss 11b can be also formed in one piece with lower plate 11.

The cross sectional shape of the inner circumference of inside boss 11b is not limited to the circular shape and may be any shape in conformity with the shape of the outer circumference of carriage side spigot 12.

In the first embodiment, inside boss 11b is hollow; however, inside boss 11b may be solid in a case where inside boss 11b does not need to accommodate carriage side spigot 12, such as a case where carriage side spigot 12 does not project from lower plate 11 in the direction opposite to lower surface 11a.

In the first embodiment, the spring constant of inner annular stopper 45 is smaller than the spring constant of outer annular stopper 40*a*; however, the spring constant of inner annular stopper 45 may be larger than the spring constant of outer annular stopper 40*a* or may be equal to the spring constant of outer annular stopper 40*a*.

As each of outer annular stopper 40*a* and inner annular stopper 45, an elastic member such as a coiled spring may be used.

As adjusting member 30, an elastic member such as a coiled spring may be used which is provided in the x direction (lateral direction) in the plane crossing the main load direction.

Second Embodiment

Figure 10:
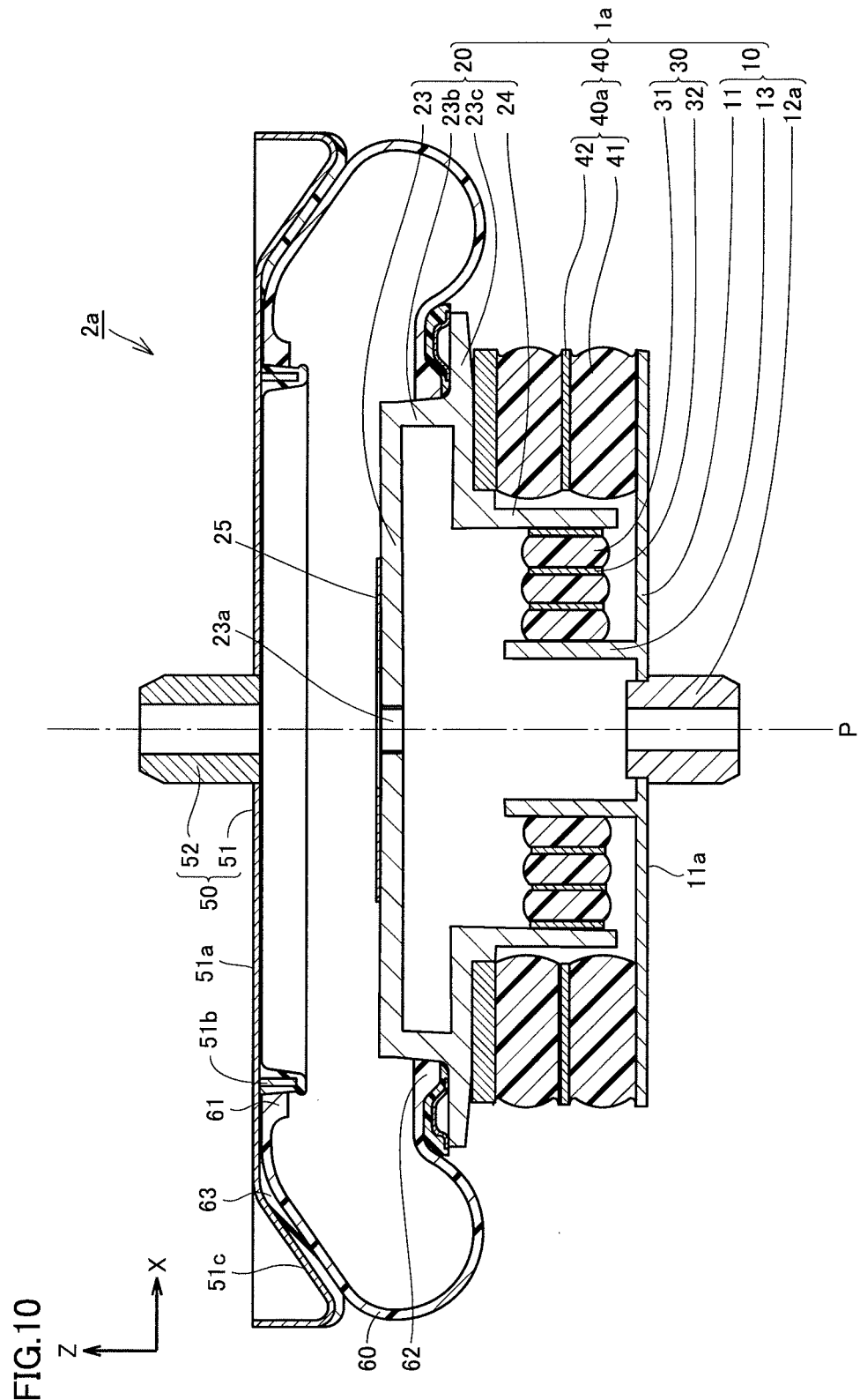
FIG. 10 is a schematic cross sectional view of an air spring according to a second embodiment of the present invention in the lateral direction.

With reference to FIG. 10, the following describes an assembly 1*a* for air spring and an air spring 2*a* according to a second embodiment. The second embodiment is directed to modifications of assembly 1 for air spring and air spring 2 in the first embodiment. Basically, each of assembly 1*a* for air spring and air spring 2*a* in the second embodiment has the same configuration and attains the same effect as those of each of assembly 1 for air spring and air spring 2 in the first embodiment as shown in FIG. 1, but is mainly different therefrom in the following points.

Firstly, in the second embodiment, inner annular stopper 45 (see FIG. 1) is not provided. Inner annular stopper 45 may not be provided depending on a spring property or the like required for the air spring. Furthermore, inner cylinder 21 and holding member 22 (see FIG. 1) both supporting inner annular stopper 45 are not also provided. Accordingly, each of assembly 1*a* for air spring and air spring 2*a* according to the second embodiment has a smaller number of components than those of each of assembly 1 for air spring and air spring 2 according to the first embodiment, thereby attaining weight reduction.

Moreover, since each of assembly 1*a* for air spring and air spring 2*a* in the second embodiment is not provided with inner annular stopper 45, a wider space is attained for adjusting member 30 in the main load direction. Accordingly, the width of adjusting member 30 of the second embodiment in the main load direction can be wider than the width of adjusting member 30 of the first embodiment in the main load direction. As a result, adjusting member 30 of the second embodiment has rigidity higher than that of adjusting member 30 of the first embodiment, and is therefore unlikely to buckle.

Secondly, flange portion 23*c* of lower surface plate 23 of the second embodiment extends from the end portion of second side wall 23*b*, in the plane (xy plane; horizontal plane) crossing the main load direction, in the direction of separating away from axis P and the direction of coming toward axis P. Diaphragm 60 is connected, at a second contact portion 62, to a portion of flange portion 23*c* far from axis P. First wall 24 is provided at a portion of flange portion 23*c* near axis P. First wall 24 is arranged inside outer annular stopper 40*a*.

Thirdly, first supporting member 10 of the second embodiment mainly has lower plate 11, a carriage side spigot 12*a*, and a second wall 13. Second wall 13 is provided on lower plate 11 outside carriage side spigot 12*a* (away from axis P) so as to extend in the direction of lower surface plate 23. Second wall 13 is arranged inside outer annular stopper 40*a*. Second wall 13 is provided to face first wall 24 in the x direction (lateral direction). In the second embodiment, first wall 24 is provided to be spaced away from axis P relative to second wall 13. Adjusting member 30 is connected to second wall 13 in first supporting member 10 and first wall 24 in second supporting member 20. Accordingly, adjusting member 30 extends in the x direction (lateral direction), and is arranged inside outer annular stopper 40*a*. It should be noted that in the second embodiment, first wall 24 is provided to be spaced away from axis P relative to second wall 13, but second wall 13 may be provided to be spaced away from axis P relative to first wall 24.

Fourthly, in the second embodiment, carriage side spigot 12 of the first embodiment is replaced with carriage side spigot 12*a*. Since carriage side spigot 12*a* of the second embodiment is not connected to adjusting member 30, carriage side spigot 12*a* has a smaller length projecting from lower plate 11 to the lower surface plate 23 side than that of carriage side spigot 12 of the first embodiment. Accordingly, carriage side spigot 12*a* of the second embodiment can be smaller than carriage side spigot 12 of the first embodiment. Moreover, assembly 1*a* for air spring and air spring 2*a* according to the second embodiment can be lighter in weight than assembly 1 for air spring and air spring 2 according to the first embodiment. It should be noted that since carriage side spigot 12*a* of the second embodiment is not connected to adjusting member 30, carriage side spigot 12*a* of the second embodiment can be configured not to project from lower plate 11 to the lower surface plate 23 side.

Fifthly, in the second embodiment, since carriage side spigot 12*a* is not connected to adjusting member 30, no inside boss 11*b* is provided. Accordingly, each of assembly 1*a* for air spring and air spring 2*a* according to the second embodiment has a smaller number of components than those of each of assembly 1 for air spring and air spring 2 according to the first embodiment, thereby attaining weight reduction.

Sixthly, in the second embodiment, in adjusting member 30, a hard member 32 is provided at a connection portion of the plurality of elastic bodies 31. Adjusting member 30 of the third embodiment includes: the plurality of elastic bodies 31 each made of rubber or the like; and at least one hard member 32 made of metal or the like. Adjusting member 30 has a stack in which elastic bodies 31 and hard member 32 are stacked alternately in the x direction (lateral direction). When adjusting member 30 thus configured is subjected to stress, tensile/compressive deformation takes place in the x direction (lateral direction) whereas shear deformation takes place in the y direction (longitudinal direction). Accordingly, the elastic property (spring property) of adjusting member 30 in the x direction (lateral direction) and the elastic property (spring property) of adjusting member 30 in the y direction (longitudinal direction) can be different from each other readily. Such a simple configuration including the plurality of elastic bodies stacked on one another can provide adjusting member 30 with an anisotropic elastic property in the plane crossing the main load direction. Adjusting member 30 may be constituted of a single elastic body 31 without having hard member 32.

Third Embodiment

Figure 11:
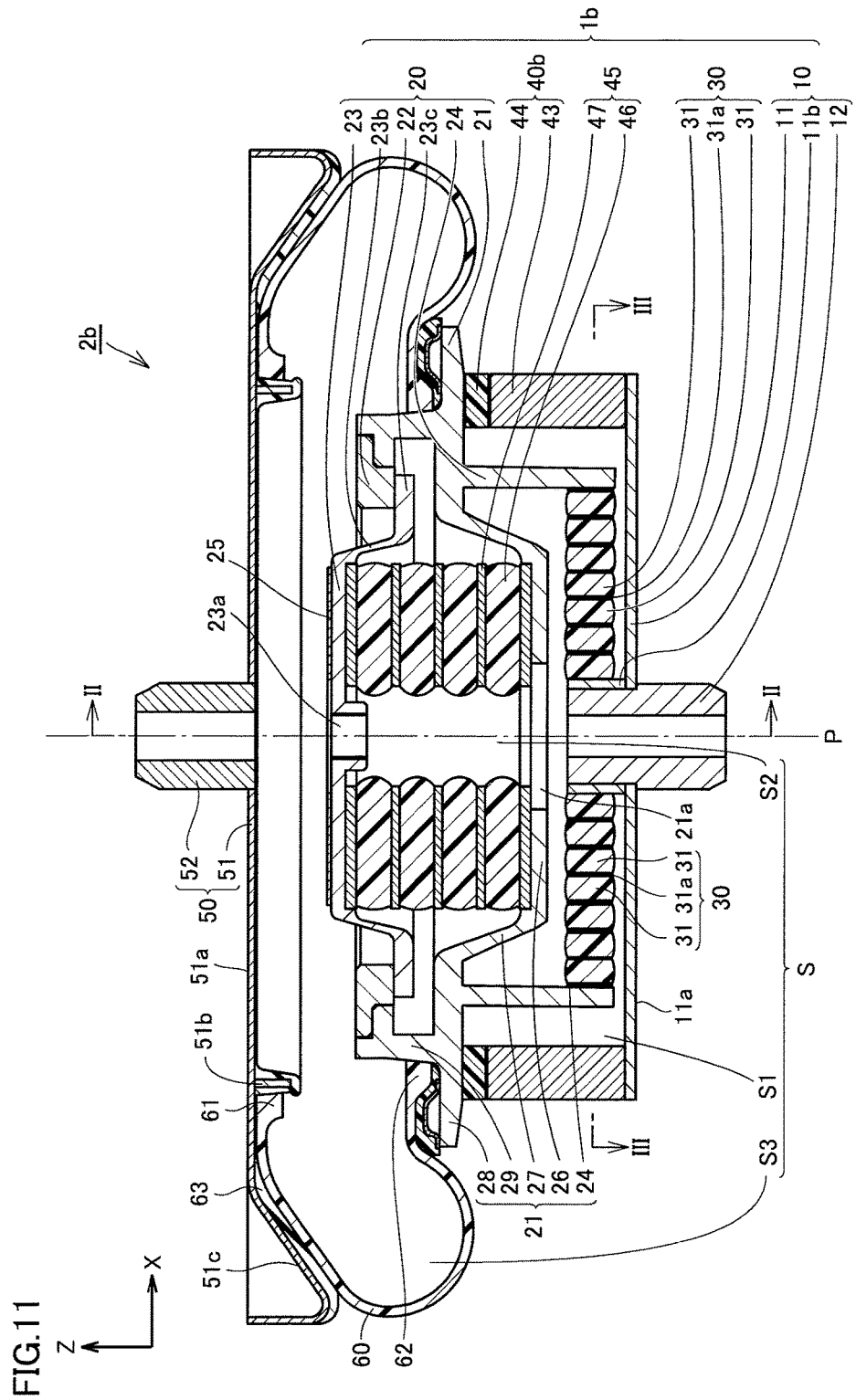
FIG. 11 is a schematic cross sectional view of an air spring according to a third embodiment of the present invention in the lateral direction.

With reference to FIG. 11, the following describes an assembly 1*b* for air spring and an air spring 2*b* according to a third embodiment. The third embodiment is directed to modifications of assembly 1 for air spring and air spring 2 in the first embodiment. Basically, each of assembly 1*b* for air spring and air spring 2*b* in the third embodiment has the same configuration and attains the same effect as those of each of assembly 1 for air spring and air spring 2 in the first embodiment as shown in FIG. 1, but is mainly different therefrom in the following points.

In the third embodiment, outer cylinder 40b includes a supporting pillar 43 and a sliding member 44. Outer cylinder 40b has a substantially isotropic shape in the plane crossing the main load direction, such as a cylindrical shape.

In the third embodiment, sliding member 44 is provided between second supporting member 20 and supporting pillar 43. Specifically, sliding member 44 is provided between flange portion 28 of inner cylinder 21 and supporting pillar 43. Sliding member 44 has a substantially isotropic shape in the plane crossing the main load direction, such as a disc shape having a hole at the center thereof. Sliding member 44 is a member that supports second supporting member 20, diaphragm 60, and third supporting member 50 such that second supporting member 20, diaphragm 60, and third supporting member 50 can be moved relative to supporting pillar 43 in the plane (xy plane; horizontal plane) crossing the main load direction. When load is applied to air spring 2b in the plane crossing the main load direction, second supporting member 20, diaphragm 60, and third supporting member 50 are moved relative to first supporting member 10 in the plane crossing the main load direction. Sliding member 44 is made of a fluorine-based resin such as polytetrafluoroethylene, for example.

Supporting pillar 43 is made of a highly rigid material such as metal.

Supporting pillar 43 extends in the main load direction, and has a substantially isotropic shape in the plane crossing the main load direction, such as a cylindrical shape. The rigidity of supporting pillar 43 of the third embodiment is larger than the rigidity of outer annular stopper 40a (see FIG. 1) having the elastic member of the first embodiment. Accordingly, supporting pillar 43 of the third embodiment supporting second supporting member 20, diaphragm 60, and third supporting member 50 can have a width in the plane crossing the main load direction that is narrower than the width of outer annular stopper 40a of the first embodiment in the plane crossing the main load direction.

As a result, in the third embodiment, first wall 24 is provided at a position farther away from axis P than that in the first embodiment. Specifically, first wall 24 is provided on flange portion 28 of inner cylinder 21. In the third embodiment, the space for adjusting member 30 is wider than that in the first embodiment. Accordingly, the number of elastic bodies 31 stacked in the x direction (lateral direction) can be increased, thereby attaining a longer length of the elastic member included in adjusting member 30. Hence, in the third embodiment, as compared with the first embodiment, it is possible to obtain larger anisotropy in spring property of assembly 1b for air spring and air spring 2b in the plane (xy plane; horizontal plane) crossing the main load direction. Adjusting member 30 may be constituted of a single elastic body 31.

In the third embodiment, inner annular stopper 45 is provided; however, inner annular stopper 45, inner cylinder 21, and holding member 22 may not be provided as in the second embodiment.

Fourth Embodiment

Figure 12:
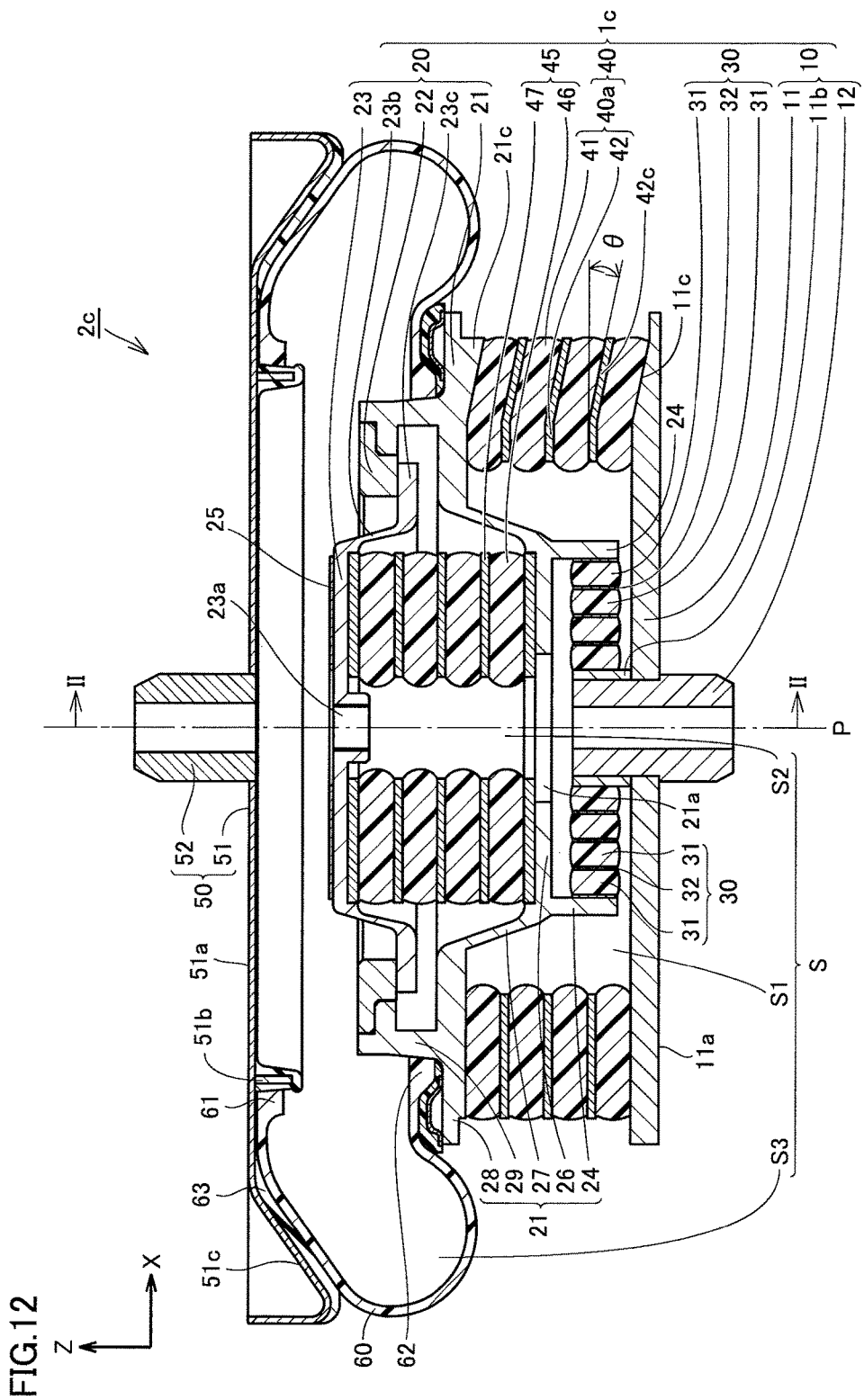
FIG. 12 is a schematic cross sectional view of an air spring according to a fourth embodiment of the present invention in the lateral direction.

With reference to FIG. 12, the following describes an assembly 1c for air spring and an air spring 2c according to a fourth embodiment. The fourth embodiment is directed to modifications of assembly 1 for air spring and air spring 2 in the first embodiment. Basically, each of assembly 1c for air spring and air spring 2c in the fourth embodiment has the same configuration and attains the same effect as those of each of assembly 1 for air spring and air spring 2 in the first embodiment as shown in FIG. 1, but is mainly different therefrom in the following points.

Firstly, inclination portions 11c, 21c, 42c are respectively provided at lower plate 11 in first supporting member 10, inner cylinder 21 in second supporting member 20, and a hard member 42 in outer annular stopper 40a, so as to be inclined in a direction in which adjusting member 30 is connected to first supporting member 10 and second supporting member 20, specifically, the x direction (lateral direction). In the fourth embodiment, each of inclination portions 11c, 21c, 42c has an inclination angle θ relative to the plane (xy plane; horizontal plane) crossing the main load direction.

Hence, not only shear deformation but also compressive deformation are included in the deformation of elastic bodies 41 of outer annular stopper 40a in the direction in which inclination portions 11e, 21c, 42c are inclined in the plane crossing the main load direction, specifically, the x direction (lateral direction). On the other hand, only shear deformation is mainly included in the deformation of elastic bodies 41 of outer annular stopper 40a in the direction crossing the direction in which inclination portions 11c, 21c, 42c are inclined, specifically, the y direction (longitudinal direction). There is a difference between the compressive deformation and the shear deformation in terms of deformation modes, thus resulting in a difference between the elastic property (spring property) caused by the compressive deformation and the elastic property (spring property) caused by the shear deformation. Therefore, outer annular stopper 40a having elastic body 41 has an anisotropic elastic property (spring property) in the plane crossing the main load direction.

In the plane crossing the main load direction, assembly 1c for air spring and air spring 2c in the fourth embodiment has not only anisotropy in elastic property (spring property) of adjusting member 30 but also anisotropy in elastic property (spring property) of outer annular stopper 40a. Accordingly, as compared with the first embodiment, assembly 1c for air spring and air spring 2c in the fourth embodiment can have a larger anisotropy in spring property in the plane crossing the main load direction.

Moreover, when providing assembly 1c for air spring and air spring 2c each having a predetermined anisotropic spring property in the plane crossing the main load direction, outer annular stopper 40a has an anisotropic elastic property (spring property) in the plane crossing the main load direction, so that the anisotropy of the elastic property (spring property) of adjusting member 30 may be small in the plane crossing the main load direction. Accordingly, for example, as a material of adjusting member 30, an inexpensive material having a small elastic property (spring property) can be selected, thereby increasing a degree of freedom in selecting a material of adjusting member 30.

Each of inclination portions 11c, 21c, 42c preferably has an inclination angle θ of not more than 30°. Generally, as inclination angle θ becomes larger, stress produced in hard member 42 become larger. When inclination angle θ is not more than 30°, the stress produced in hard member 42 does not become too large, whereby hard member 42 having the same thickness as that of the conventional one can be used. Inclination angle θ of each of inclination portions 11c, 21c, 42c is more preferably 2° to 25°, and is further preferably 5° to 20°.

In the fourth embodiment, inclination portions 11c, 21c, 42c are provided respectively at lower plate 11 in first supporting member 10, inner cylinder 21 in second supporting member 20, and hard member 42 in outer annular stopper 40a; however, the same effect is obtained when at least one of inclination portions 11c, 21c, 42c is provided. Moreover, in the fourth embodiment, inclination portions 11c, 21c, 42c all have the same inclination angle θ; however, inclination portions 11c, 21c, 42c may have different inclination angles.

Secondly, in the fourth embodiment, adjusting member 30 has hard member 32 at a connection portion of the plurality of elastic bodies 31. Accordingly, the elastic property (spring property) of adjusting member 30 in the x direction (lateral direction) and the elastic property (spring property) of adjusting member 30 in the y direction (longitudinal direction) can be different from each other readily. It should be noted that adjusting member 30 may be constituted of a single elastic body 31 without having hard member 32.

In the fourth embodiment, inner annular stopper 45 is provided; however, inner annular stopper 45, inner cylinder 21, and holding member 22 may not be provided as in the second embodiment.

Fifth Embodiment

Figure 13:
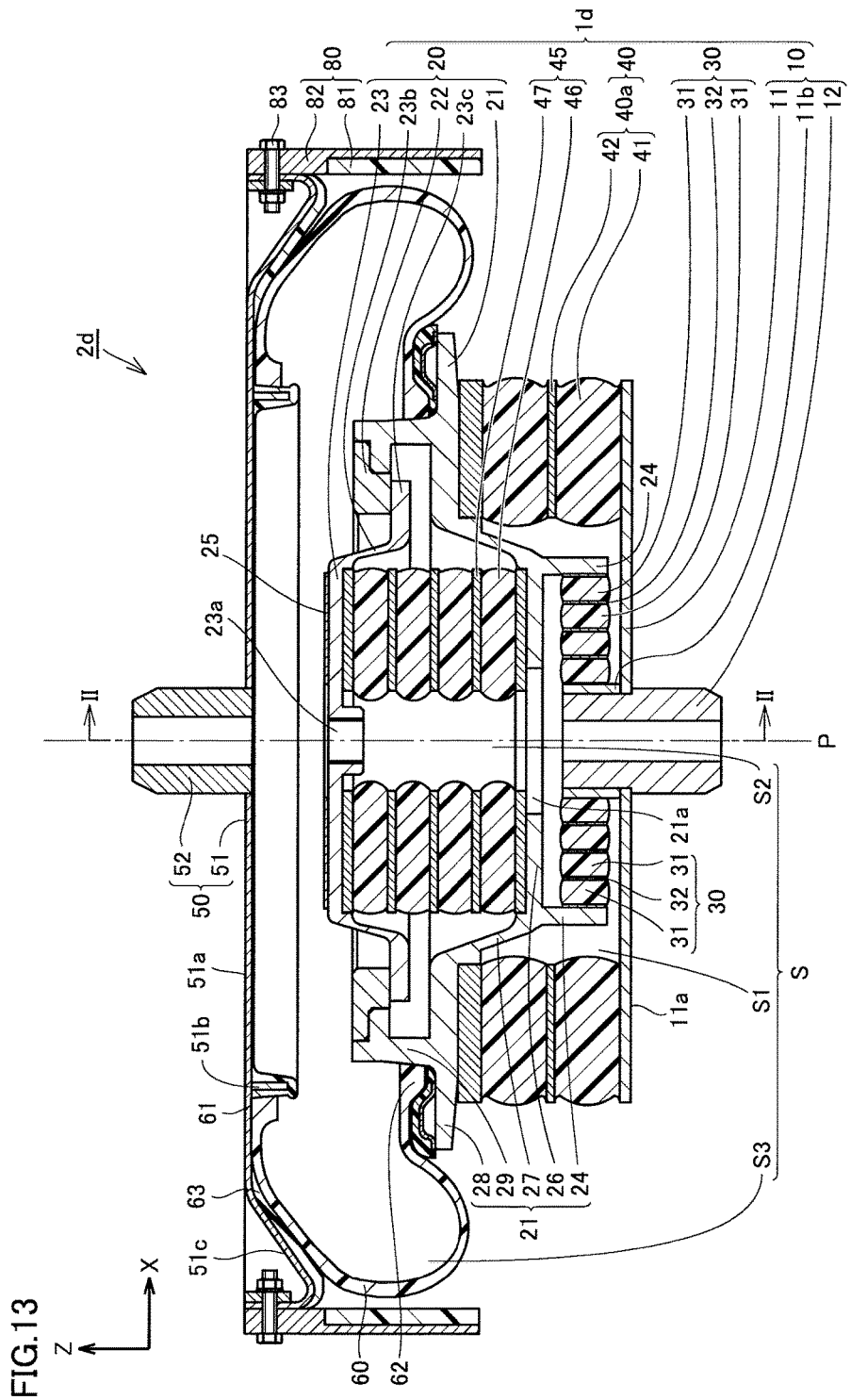
FIG. 13 is a schematic cross sectional view of an air spring according to a fifth embodiment of the present invention in the lateral direction, and is a schematic cross sectional view along a cross sectional line XIII-XIII shown in FIG. 14.
Figure 14:
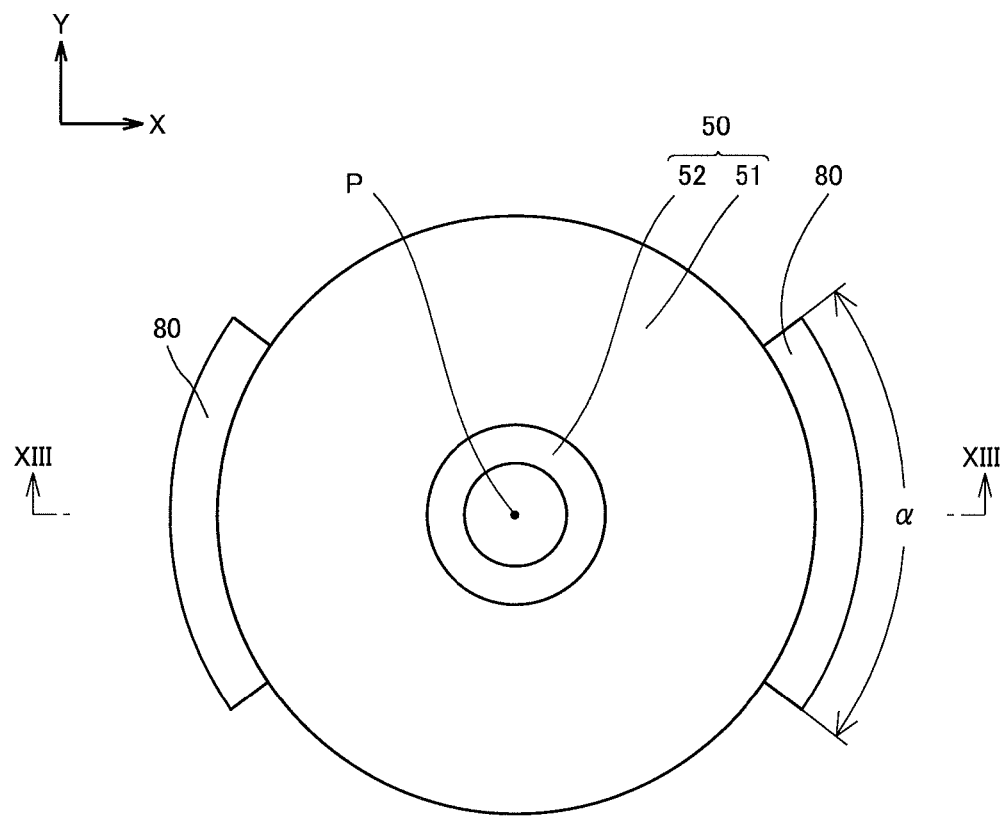
FIG. 14 is a schematic top view of the air spring according to the fifth embodiment of the present invention.

With reference to FIG. 13 and FIG. 14, the following describes an assembly 1d for air spring and an air spring 2d according to a fifth embodiment. The fifth embodiment is directed to modifications of assembly 1 for air spring and air spring 2 in the first embodiment. Basically, each of assembly 1d for air spring and air spring 2d in the fifth embodiment has the same configuration and attains the same effect as those of each of assembly 1 for air spring and air spring 2 in the first embodiment as shown in FIG. 1, but is mainly different therefrom in the following points.

Firstly, third supporting member 50 has covers 80 each restricting movement of diaphragm 60 in the direction in which adjusting member 30 is connected to first supporting member 10 and second supporting member 20. Specifically, covers 80 are provided on third supporting member 50 at both the sides of outer circumferential portion 51c of upper surface plate 51 in the x direction (lateral direction). Covers 80 are fixed by bolts 83 on third supporting member 50 at both the sides of outer circumferential portion 51c of upper surface plate 51 in the x direction (lateral direction).

When load is applied to air spring 2d in the plane crossing the main load direction, outer annular stopper 40a, adjusting member 30, and diaphragm 60 are elastically deformed in the plane crossing the main load direction. The elastic deformation of diaphragm 60 causes diaphragm 60 to hit each of covers 80. Accordingly, diaphragm 60, in which pressurized air is sealed, is subject to a reaction force from cover 80. Covers 80 are provided at both the sides of outer circumferential portion 51c of upper surface plate 51 in the x direction (lateral direction). Hence, diaphragm 60 is subject to the reaction force from cover 80 in the direction in which adjusting member 30 is connected to first supporting member 10 and second supporting member 20, specifically, the x direction (lateral direction); however, diaphragm 60 is not subject to the reaction force in the direction crossing the direction in which adjusting member 30 is connected to first supporting member 10 and second supporting member 20, specifically, the y direction (longitudinal direction). Accordingly, the spring constant of diaphragm 60 in the direction in which adjusting member 30 is connected to first supporting member 10 and second supporting member 20, specifically, the x direction (lateral direction), is larger than the spring constant of diaphragm 60 in the direction crossing the direction in which adjusting member 30 is connected to first supporting member 10 and second supporting member 20, specifically, the y direction (longitudinal direction).

Air spring 2d of the fifth embodiment has not only anisotropy in elastic property (spring property) of adjusting member 30 but also anisotropy in spring property of diaphragm 60 in the plane crossing the main load direction. Accordingly, as compared with the first embodiment, air spring 2d of the fifth embodiment can have large anisotropy in spring property in the plane crossing the main load direction.

Moreover, when providing air spring 2d having a predetermined anisotropic spring property in the plane crossing the main load direction, diaphragm 60 has an anisotropic spring property in the plane crossing the main load direction, so that the anisotropy of the elastic property (spring property) of adjusting member 30 may be small in the plane crossing the main load direction. Accordingly, for example, as a material of adjusting member 30, an inexpensive material having a small elastic property (spring property) can be selected, thereby increasing a degree of freedom in selecting a material of adjusting member 30.

When diaphragm 60 is brought into contact with cover 80, diaphragm 60 is worn out, thus resulting in a short life of air spring 2d. To address this, cover 80 has a sheet 81 at a portion to be in contact with diaphragm 60. Sheet 81 includes: a material having a small friction coefficient such as fluororesin or polyethylene; or a material having elasticity such as rubber. Moreover, cover 80 has a third wall 82 to hold sheet 81. Accordingly, the wear of diaphragm 60, which is caused by the contact of diaphragm 60 with sheet 81, is decreased, thus attaining an extended life of air spring 2d.

With reference to FIG. 14, in the case where no load is applied to air spring 2d in the plane crossing the main load direction, an angle α at which cover 80 extends is preferably not less than 2° and not more than 150° when viewing cover 80 from axis P. If angle α becomes larger than 150°, the anisotropy in spring property of air spring 2d cannot be increased in the plane crossing the main load direction and a contact area between cover 80 and diaphragm 60 becomes large, so that it is difficult to suppress wear of diaphragm 60. If angle α is less than 2°, the reaction force received by diaphragm 60 from cover 80 cannot be large, with the result that the anisotropy in spring property of air spring 2d cannot be increased in the plane crossing the main load direction. Angle α is more preferably 20° to 90°, and is further preferably 40° to 60°. This is because diaphragm 60 can be suppressed from being worn out by the contact of diaphragm 60 with cover 80 and cover 80 can provide diaphragm 60 with sufficient anisotropy in spring property.

In the fifth embodiment, covers 80 are provided on third supporting member 50 at both the sides of outer circumferential portion 51c of upper surface plate 51 in the x direction (lateral direction); however, the spring property of diaphragm 60 can have anisotropy even when cover 80 is provided on third supporting member 50 at only one side of outer circumferential portion 51c of upper surface plate 51 in the x direction (lateral direction). Hence, the same effect is obtained.

Secondly, in the fifth embodiment, adjusting member 30 has hard member 32 at a connection portion of the plurality of elastic bodies 31. Accordingly, the elastic property (spring property) of adjusting member 30 in the x direction (lateral direction) and the elastic property (spring property) of adjusting member 30 in the y direction (longitudinal direction) can be different from each other readily. It should be noted that adjusting member 30 may be constituted of a single elastic body 31 without having hard member 32.

In the fifth embodiment, inner annular stopper 45 is provided; however, inner annular stopper 45, inner cylinder 21, and holding member 22 may not be provided as in the second embodiment.

Moreover, in the fifth embodiment, outer cylinder 40 is constituted of outer annular stopper 40a having the elastic member; however, outer cylinder 40b having supporting pillar 43 and sliding member 44 may be employed as in the third embodiment.

Sixth Embodiment

Figure 15:
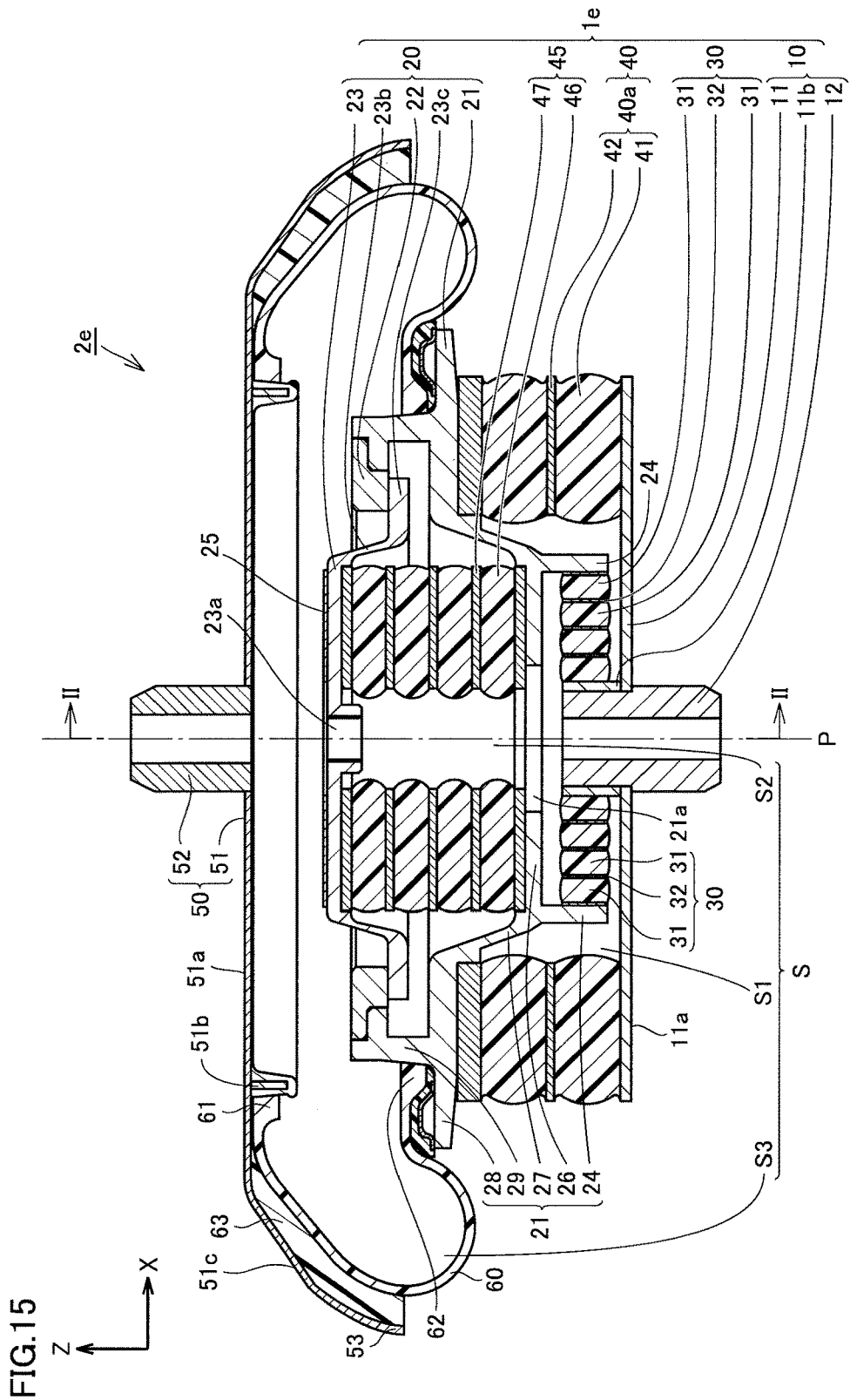
FIG. 15 is a schematic cross sectional view of an air spring according to a sixth embodiment of the present invention in the lateral direction.

With reference to FIG. 15, the following describes an assembly 1e for air spring and an air spring 2e according to a sixth embodiment. The sixth embodiment is directed to modifications of assembly 1e for air spring and air spring 2d in the fifth embodiment. Basically, each of assembly 1e for air spring and air spring 2e in the sixth embodiment has the same configuration and attains the same effect as those of each of assembly 1d for air spring and air spring 2d in the fifth embodiment as shown in FIG. 13, but is mainly different therefrom in the following points.

Instead of covers 80 in the fifth embodiment, third supporting member 50 of the sixth embodiment has covers 53 each restricting movement of diaphragm 60 in the direction in which adjusting member 30 is connected to first supporting member 10 and second supporting member 20. Specifically, covers 53 are provided on third supporting member 50 at both the sides of outer circumferential portion 51c of upper surface plate 51 in the x direction (lateral direction). Each of covers 53 is formed by extending outer circumferential portion 51c of upper surface plate 51 and buffer portion 63 in the x direction (lateral direction). Accordingly, air spring 2e according to the sixth embodiment can have a smaller number of components than those of air spring 2d according to the fifth embodiment.

Also in the sixth embodiment, as with the fifth embodiment, angle α at which cover 53 extends is preferably not less than 2° and not more than 150°, is more preferably 20° to 90°, and is further preferably 40° to 60°.

It should be noted that in the sixth embodiment, covers 53 are provided in third supporting member 50 at both the sides of outer circumferential portion 51c of upper surface plate 51 in the x direction (lateral direction); however, the spring property of diaphragm 60 can have anisotropy even when cover 53 is provided on third supporting member 50 at only one side of outer circumferential portion 51c of upper surface plate 51 in the x direction (lateral direction). Hence, the same effect is obtained.

In the sixth embodiment, inner annular stopper 45 is provided; however, inner annular stopper 45, inner cylinder 21, and holding member 22 may not be provided as in the second embodiment.

Moreover, in the sixth embodiment, outer cylinder 40 is constituted of outer annular stopper 40a having the elastic member; however, outer cylinder 40b having supporting pillar 43 and sliding member 44 may be employed as in the third embodiment.

Seventh Embodiment

With reference to FIG. 16, the following describes an assembly 1 for air spring and an air spring 2 according to a seventh embodiment. The seventh embodiment is directed to modifications of assembly 1 for air spring and air spring 2 in the first embodiment as shown in FIG. 3. Basically, each of assembly 1 for air spring and air spring 2 in the seventh embodiment has the same configuration and attains the same effect as those of each of assembly 1 for air spring and air spring 2 in the first embodiment as shown in FIG. 1 to FIG. 3, but is mainly different therefrom in the following points.

In the seventh embodiment, a recess 40c is provided at a portion of inner circumferential surface of outer annular stopper 40a in the x direction (lateral direction), and adjusting member 30 extends into recess 40c. Accordingly, the number of elastic bodies 31 stacked in the x direction (lateral direction) can be increased, thereby attaining an increased length of the elastic member included in adjusting member 30 extending in the x direction (lateral direction). Hence, in the seventh embodiment, as compared with the first embodiment, it is possible to obtain larger anisotropy in spring property of each of assembly 1 for air spring and air spring 2 in the plane (xy plane; horizontal plane) crossing the main load direction. The life of adjusting member 30 can be increased. Moreover, the tolerable displacement of adjusting member 30 can be increased.

When the length of the elastic member included in adjusting member 30 in the seventh embodiment is the same as that of the elastic member included in adjusting member 30 in the first embodiment, the outer shape of outer annular stopper 40a can be small. This leads to a small size of each of assembly 1 for air spring and air spring 2 in the plane (xy plane; horizontal plane) crossing the main load direction.

In the seventh embodiment, first wall 24 is provided at flange portion 28 (not shown) such that adjusting member 30 can extend into recess 40c.

It should be noted that adjusting member 30 may be constituted of a single elastic member 31.

Although the embodiment of the present invention has been illustrated as described above, the embodiment can be modified in various manners. Moreover, the scope of the present invention is not limited by the embodiment described above. The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention is particularly advantageously applied to an assembly for air spring, an air spring, and a carriage for vehicle such as a railroad vehicle.

REFERENCE SIGNS LIST 1, 1a, 1b, 1c, 1d, 1e, 101: assembly for air spring; 2, 2a, 2b, 2c, 2d, 2e, 102: air spring; 10: first supporting member; 11: lower plate; 11a: lower surface; 11b: inside boss; 11c, 21c, 42c: inclination portion; 12, 12a: carriage side spigot; 13: second wall; 20: second supporting member; 21: inner cylinder; 21a, 23a: through portion; 22: holding member; 23: lower surface plate; 23b: second side wall; 23c, 28: flange portion; 24: first wall; 25: fluorine-based resin film; 26: supporting portion; 27: first side wall; 29: upper wall; 30: adjusting member; 31, 41, 46: elastic body; 31a: connection portion; 32, 42, 47: hard member; 40, 40b: outer cylinder; 40a: outer annular stopper; 40c: cutoff portion; 43: supporting pillar; 44: sliding member; 45: inner annular stopper; 50: third supporting member; 51: upper surface plate; 51a: upper surface; 51b: protrusion; 51c: outer circumferential portion; 52: vehicle body side spigot; 53, 80: cover; 60: diaphragm; 61: first contact portion; 62: second contact portion; 63: buffer portion; 70: carriage; 71: axle; 72: wheel; 73: carriage frame; 73*a*: side beam; 74: axle spring; 81: sheet; 82: third wall; 83: bolt; P: center axis; S: closed space; S1, S2, S3: space.

The invention claimed is:

1. An air spring, comprising:
 a first supporting member;
 a second supporting member arranged to be spaced away from the first supporting member in a main load direction;
 a third supporting member arranged to be spaced away from the second supporting member in the main load direction, the second supporting member arranged between the first supporting member and the third supporting member;
 an elastically deformable diaphragm connected to the second supporting member and the third supporting member to form a closed space; and
 an adjusting member connected to the first supporting member and the second supporting member in a plane crossing the main load direction, the adjusting member having anisotropy in elastic property in the plane, the adjusting member being a directional stopper extending along a first direction in the plane, the adjusting member including a plurality of first elastic bodies that are stacked in the first direction, and the adjusting member not extending in a second direction in the plane, the second direction being perpendicular to the first direction.

2. The air spring according to claim 1, further comprising an outer cylinder between the first supporting member and the second supporting member, wherein
 the adjusting member is arranged inside the outer cylinder.

3. The air spring according to claim 2, wherein the outer cylinder includes an outer annular stopper having an elastic member.

4. The assembly for air spring according to claim 3, wherein at least one of the first supporting member and the second supporting member includes an inclination portion that provides resistance against deformation of the outer annular stopper in a direction in which the adjusting member is connected to the first supporting member and the second supporting member.

5. The air spring according to claim 3, wherein the outer annular stopper has two second elastic bodies and a hard member disposed between the two second elastic bodies.

6. The assembly for air spring according to claim 5, wherein the hard member has an inclination portion that provides resistance against deformation of the outer annular stopper in a direction in which the adjusting member is connected to the first supporting member and the second supporting member.

7. The assembly for air spring according to claim 3, wherein a recess is provided at a portion of an inner side of the outer annular stopper, and
 wherein at least a portion of the adjusting member extends into the recess.

8. The air spring according to claim 3, wherein the outer annular stopper has a substantially isotropic shape in the plane crossing the main load direction.

9. The assembly for air spring according to claim 2, wherein the outer cylinder includes a supporting pillar and a sliding member, and
 wherein the sliding member is provided between the second supporting member and the supporting pillar.

10. The air spring according to claim 2, further comprising an inner annular stopper having an elastic member,
 wherein at least a portion of the inner annular stopper extends to an inner space of the outer cylinder.

11. The air spring according to claim 1, wherein the first supporting member includes a carriage side spigot, and
 wherein the adjusting member is connected to the carriage side spigot and the second supporting member.

12. The air spring according to claim 1, wherein at least one of the first supporting member and the second supporting member includes a wall, and
 wherein the adjusting member is connected to the wall.

13. The air spring according to claim 1, wherein the third supporting member has a cover that restricts movement of the diaphragm in the direction in which the adjusting member is connected to the first supporting member and the second supporting member.

14. A carriage for vehicle, comprising the air spring as recited in claim 1.

15. The air spring according to claim 3, wherein the outer annular stopper has a stack in which a plurality of second elastic bodies and a plurality of hard members are stacked alternately.

* * * * *